United States Patent [19]

Conary et al.

[11] Patent Number: 5,842,029
[45] Date of Patent: Nov. 24, 1998

[54] METHOD AND APPARATUS FOR POWERING DOWN AN INTEGRATED CIRCUIT TRANSPARENTLY AND ITS PHASE LOCKED LOOP

[75] Inventors: James W. Conary, Aloha; Robert R. Beutler, Lake Oswego, both of Oreg.

[73] Assignee: Intel Corporation, Santa Clara, Calif.

[21] Appl. No.: 878,867

[22] Filed: Jun. 19, 1997

Related U.S. Application Data

[63] Continuation of Ser. No. 713,734, Sep. 19, 1996, abandoned, which is a continuation of Ser. No. 36,530, Mar. 24, 1993, which is a continuation-in-part of Ser. No. 778,575, Oct. 17, 1991, abandoned.

[51] Int. Cl.$^6$ ..................................................... G06F 1/32
[52] U.S. Cl. ....................................................... 395/750.04

[56] References Cited

U.S. PATENT DOCUMENTS

| | | |
|---|---|---|
| 3,623,017 | 11/1971 | Lowell . |
| 3,715,729 | 2/1973 | Mercy . |
| 3,895,311 | 7/1975 | Basse et al. . |
| 3,919,695 | 11/1975 | Gooding . |
| 3,931,585 | 1/1976 | Barker et al. . |
| 3,936,762 | 2/1976 | Cox, Jr. et al. . |

(List continued on next page.)

FOREIGN PATENT DOCUMENTS

| | | |
|---|---|---|
| 0103755A2 | 3/1984 | European Pat. Off. . |
| 0140814A3 | 5/1985 | European Pat. Off. . |
| 0167853 | 6/1985 | European Pat. Off. . |
| 0242010 | 12/1987 | European Pat. Off. . |
| 0366326 | 10/1989 | European Pat. Off. . |
| 0385567 | 1/1990 | European Pat. Off. . |
| 0366250A1 | 5/1990 | European Pat. Off. . |
| 0368144A2 | 5/1990 | European Pat. Off. . |
| 0419908A2 | 4/1991 | European Pat. Off. . |
| 0451661A2 | 10/1991 | European Pat. Off. . |
| 0451661A3 | 10/1991 | European Pat. Off. . |
| 0478132A1 | 4/1992 | European Pat. Off. . |
| 2010551 | 6/1979 | United Kingdom . |
| 2130765 | 6/1984 | United Kingdom . |

OTHER PUBLICATIONS

IBM Technical Disclosure Bulletin, vol. 33, No. 6B, Nov. 1990, New York, "Multiple Phase Clock Generation From a Single Oscillator", pp. 322–325.

Wescon/89 Conference Record, Nov. 14, 1989, San Francisco, CA, "The VL86C020 RISC with On–board Cache", pp. 251–254.

Case, Brain. "R4000 Extends R3000 Architecture", *Microprocessor Report*, vol. v5n19, Oct. 16, 1991.

Slater, Michael. "MIPS Previews 64–Bit R4000 Architecture", *Microprocessor Report*, vol. v522, Feb. 6, 1991, pp. p1(6).

Wilson, John. "MIPS Rethinks RICS with Superpipelining", *Computer Design*, vol. v30n3, Feb. 1, 1991, p. P28(3).

Intel Automotive Components Handbook "Power–On Reset", 1988, pp. 10–24 & 10–25.

Motorola MC6802032—Bit Microporcessor User's Manual, 3rd Edition, 1990, pp. 1–3.

*Primary Examiner*—Ayaz R. Sheikh
*Assistant Examiner*—David A. Wiley
*Attorney, Agent, or Firm*—Blakely, Sokoloff, Taylor & Zafman

[57] ABSTRACT

A method and apparatus for powering down a microprocessor in a computer system. The method and apparatus includes a phase locked loop (PLL) circuit, wherein the phase locked loop generates bus clock signals for clocking the operations on the bus and core clock signals for clocking the core of the processor in response to global clock signal of the computer system. The microprocessor includes circuitry for processing data synchronous with the core clock signals. The method and circuit also includes circuitry for placing the processor in a reduced power consumption state in response to the execution of a power down instruction. In this manner, the computer system reduces power consumption.

56 Claims, 12 Drawing Sheets

U.S. PATENT DOCUMENTS

| | | |
|---|---|---|
| 4,077,016 | 2/1978 | Sanders et al. . |
| 4,095,267 | 6/1978 | Morimoto . |
| 4,203,153 | 5/1980 | Boyd . |
| 4,264,863 | 4/1981 | Kojima . |
| 4,293,927 | 10/1981 | Hoshii . |
| 4,300,019 | 11/1981 | Toyomaki . |
| 4,365,290 | 12/1982 | Nelms et al. . |
| 4,405,898 | 9/1983 | Flemming . |
| 4,419,756 | 12/1983 | Cheng-Quispe et al. ................... 375/7 |
| 4,479,191 | 10/1984 | Nojima et al. . |
| 4,615,005 | 9/1986 | Maejima et al. . |
| 4,639,864 | 1/1987 | Katzman et al. . |
| 4,667,289 | 5/1987 | Yoshida et al. . |
| 4,669,099 | 5/1987 | Zinn . |
| 4,698,748 | 10/1987 | Juzswik et al. . |
| 4,758,945 | 7/1988 | Remedi . |
| 4,766,567 | 8/1988 | Kato . |
| 4,780,843 | 10/1988 | Tietjen . |
| 4,814,591 | 3/1989 | Nara et al. . |
| 4,823,292 | 4/1989 | Hillion . |
| 4,841,440 | 6/1989 | Yonezu et al. . |
| 4,881,205 | 11/1989 | Aihara . |
| 4,896,260 | 1/1990 | Hyatt . |
| 4,907,183 | 3/1990 | Tanaka . |
| 4,922,450 | 5/1990 | Rose et al. . |
| 4,931,748 | 6/1990 | McDermott et al. ....................... 331/1 |
| 4,935,863 | 6/1990 | Calvas et al. . |
| 4,967,895 | 11/1990 | Speas ...................................... 194/200 |
| 4,979,097 | 12/1990 | Triolo et al. . |
| 4,980,836 | 12/1990 | Carter et al. . |
| 4,991,129 | 2/1991 | Swartz . |
| 5,021,679 | 6/1991 | Fairbanks et al. . |
| 5,025,387 | 6/1991 | Frane . |
| 5,059,924 | 10/1991 | JenningsCheck . |
| 5,075,638 | 12/1991 | Babin et al. ................................ 331/1 |
| 5,077,686 | 12/1991 | Rubenstein . |
| 5,083,266 | 1/1992 | Watanabe . |
| 5,103,114 | 4/1992 | Fitch . |
| 5,123,107 | 6/1992 | Mensch, Jr. . |
| 5,129,091 | 7/1992 | Yorimoto et al. . |
| 5,133,064 | 7/1992 | Hotta et al. . |
| 5,151,992 | 9/1992 | Nagae . |
| 5,167,024 | 11/1992 | Smith et al. . |
| 5,175,845 | 12/1992 | Little . |
| 5,220,672 | 6/1993 | Nakao et al. . |
| 5,239,652 | 8/1993 | Seibert et al. . |
| 5,249,298 | 9/1993 | Bolan et al. . |
| 5,251,320 | 10/1993 | Kuzawinski et al. . |
| 5,287,384 | 2/1994 | Avery et al. ................................ 375/1 |
| 5,319,771 | 6/1994 | Takeda . |
| 5,336,939 | 8/1994 | Eitrheim et al. . |
| 5,355,502 | 10/1994 | Schowe et al. ......................... 395/750 |
| 5,359,232 | 10/1994 | Eitrheim et al. . |
| 5,361,044 | 11/1994 | Norimatu et al. .......................... 331/1 |
| 5,473,767 | 12/1995 | Kardach et al. . |
| 5,560,001 | 9/1996 | Kardach et al. . |
| 5,560,002 | 9/1996 | Kardach et al. . |
| 5,630,143 | 5/1997 | Maher et al. . |
| 5,632,037 | 5/1997 | Maher et al. . |

FIG_1

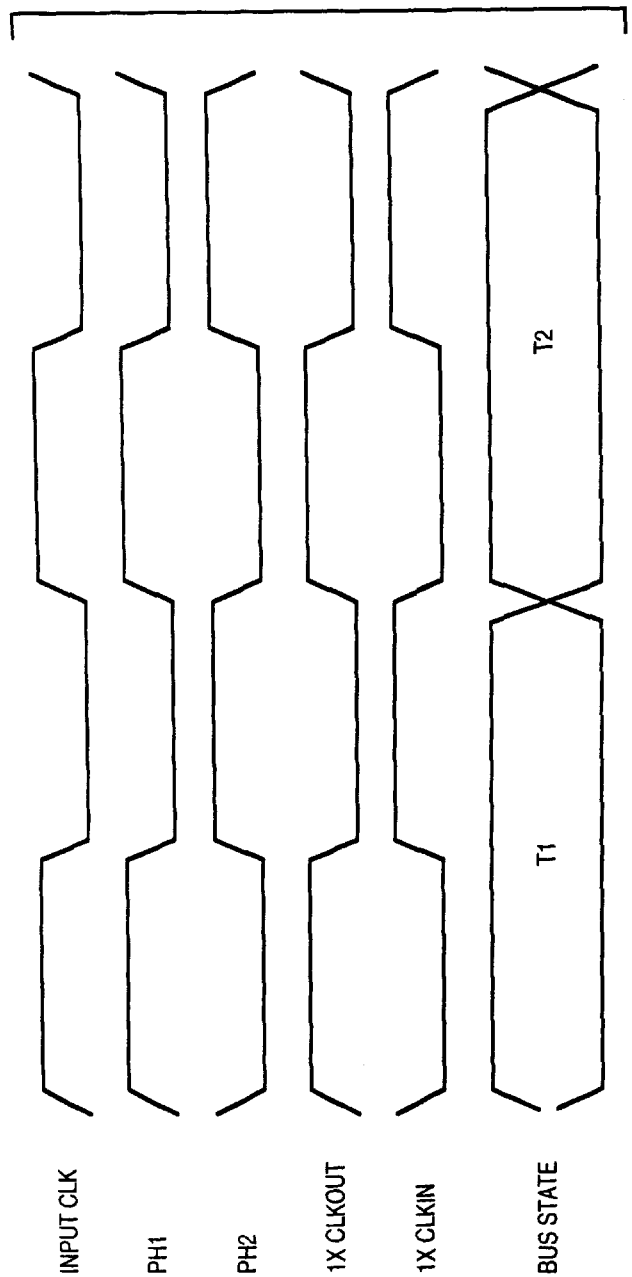
FIG_3
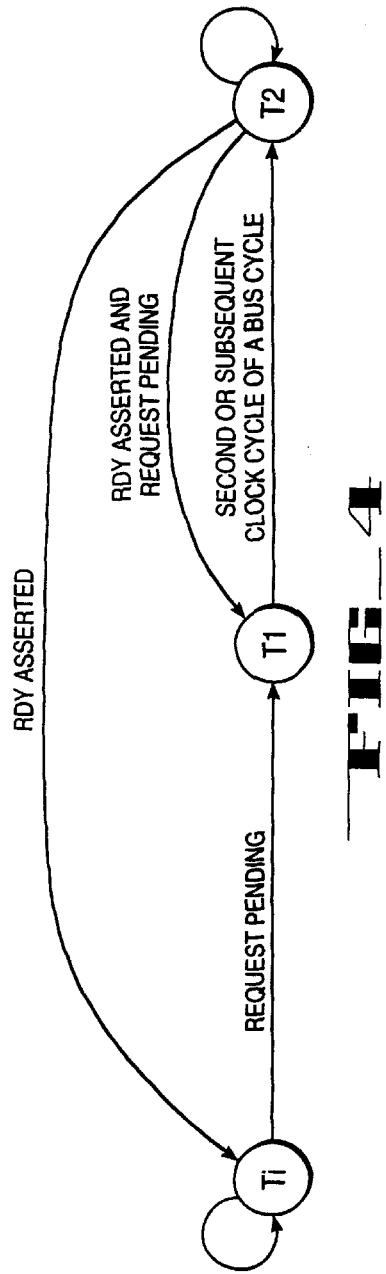
FIG_4

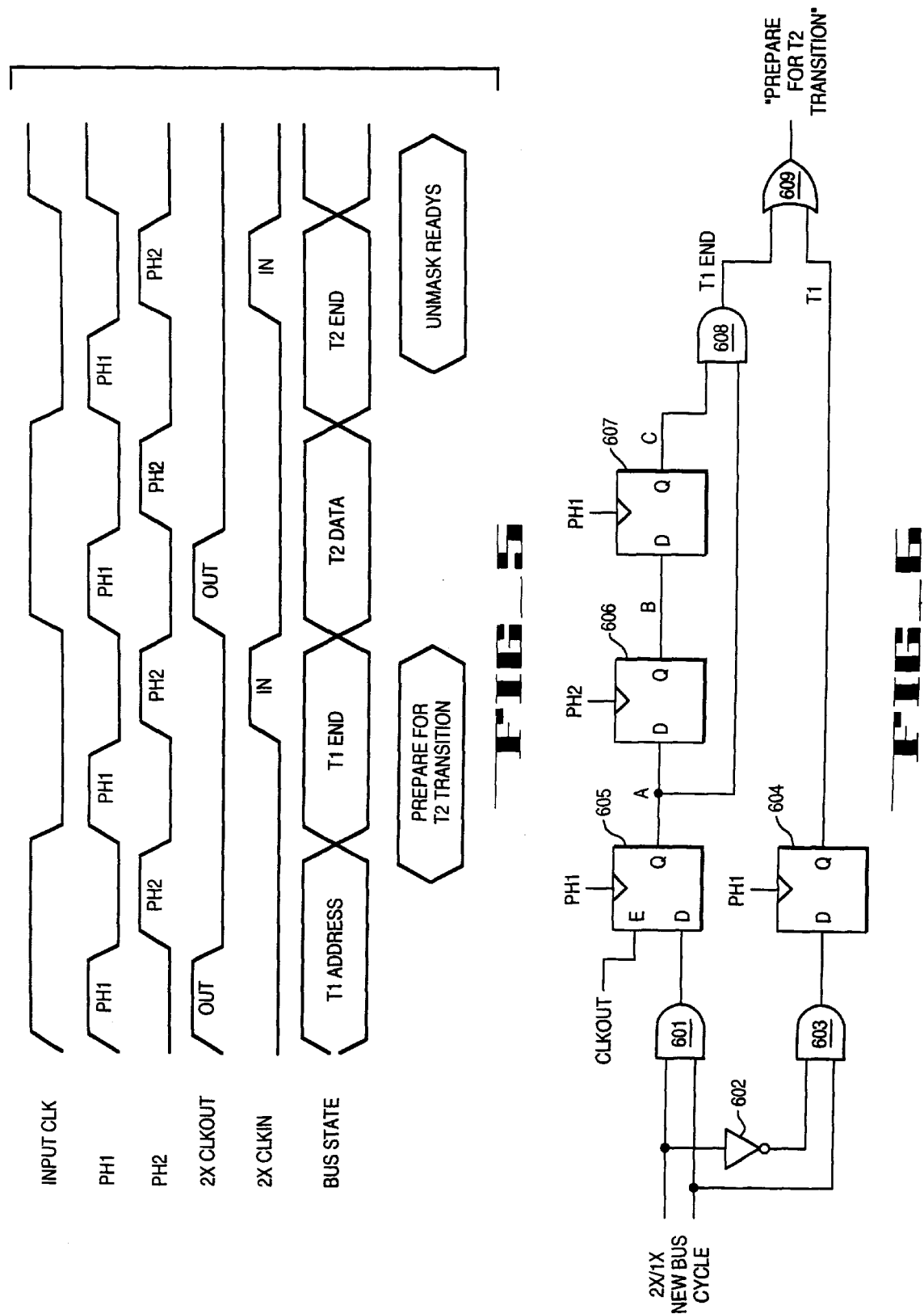

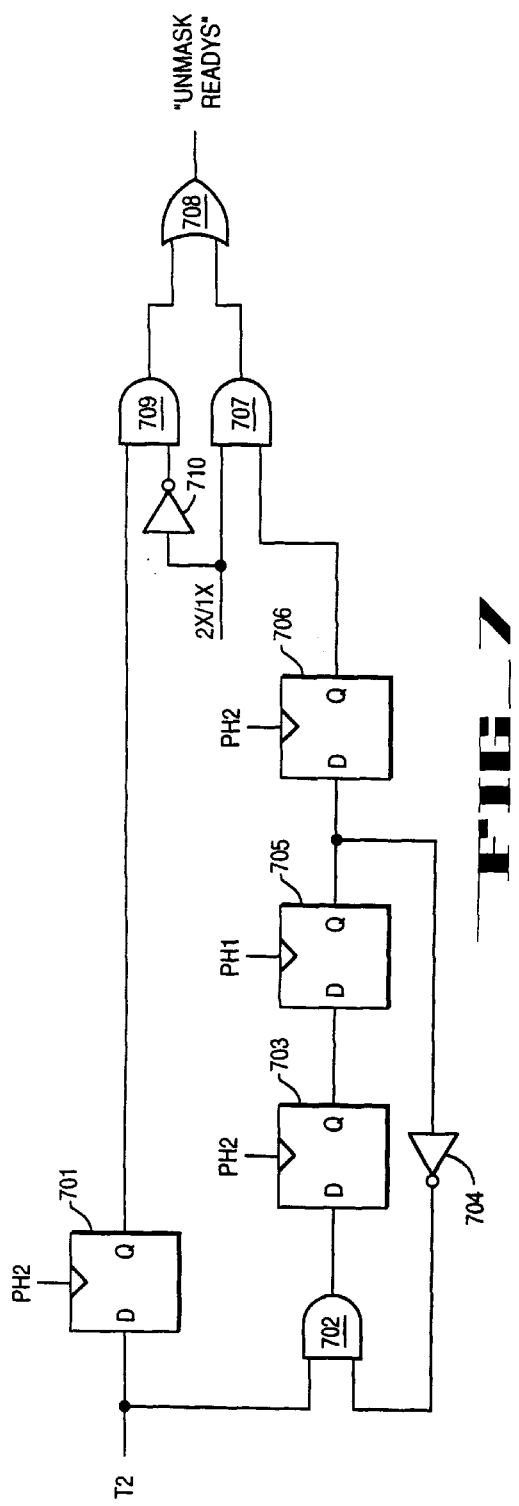

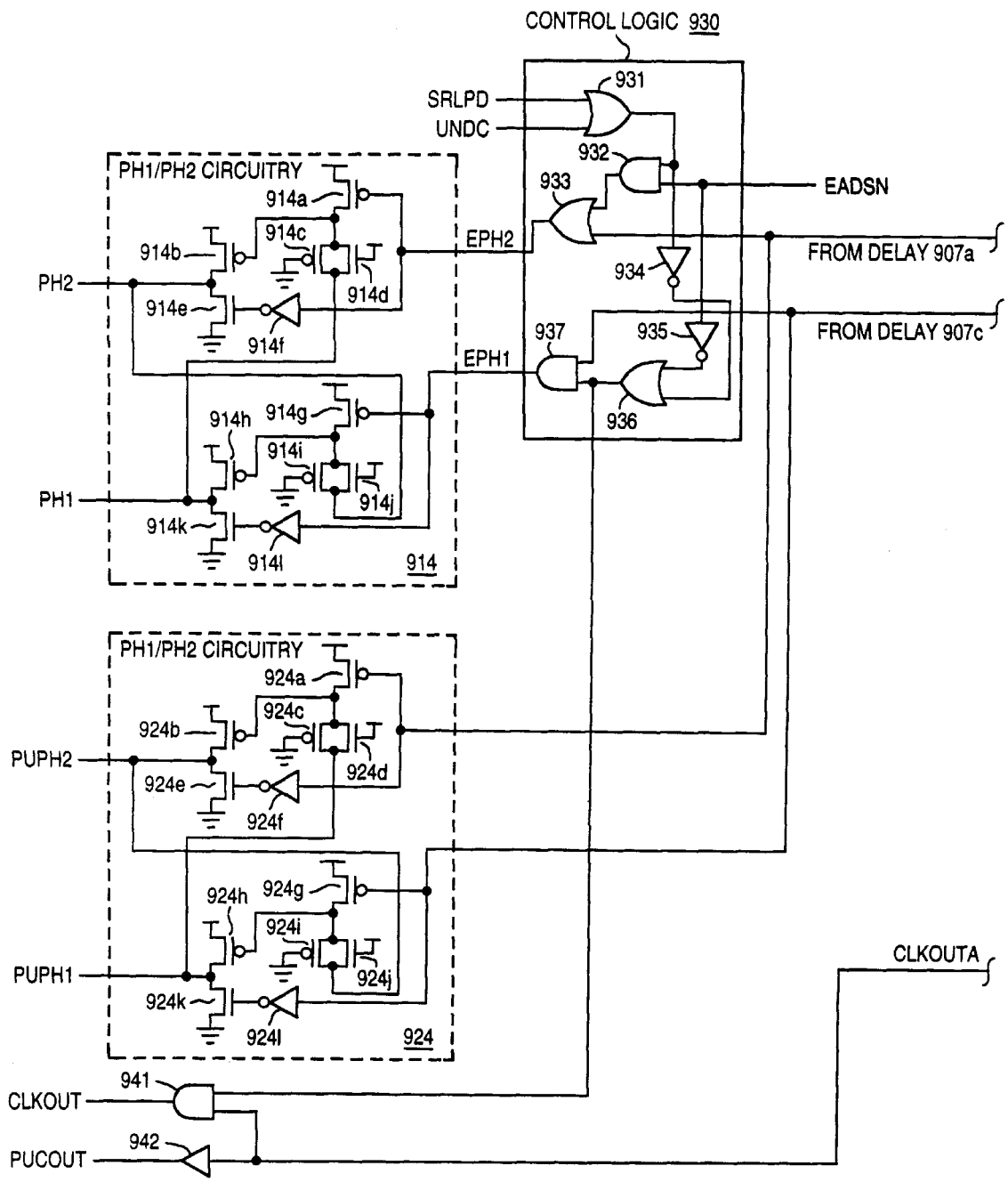
FIG_9A

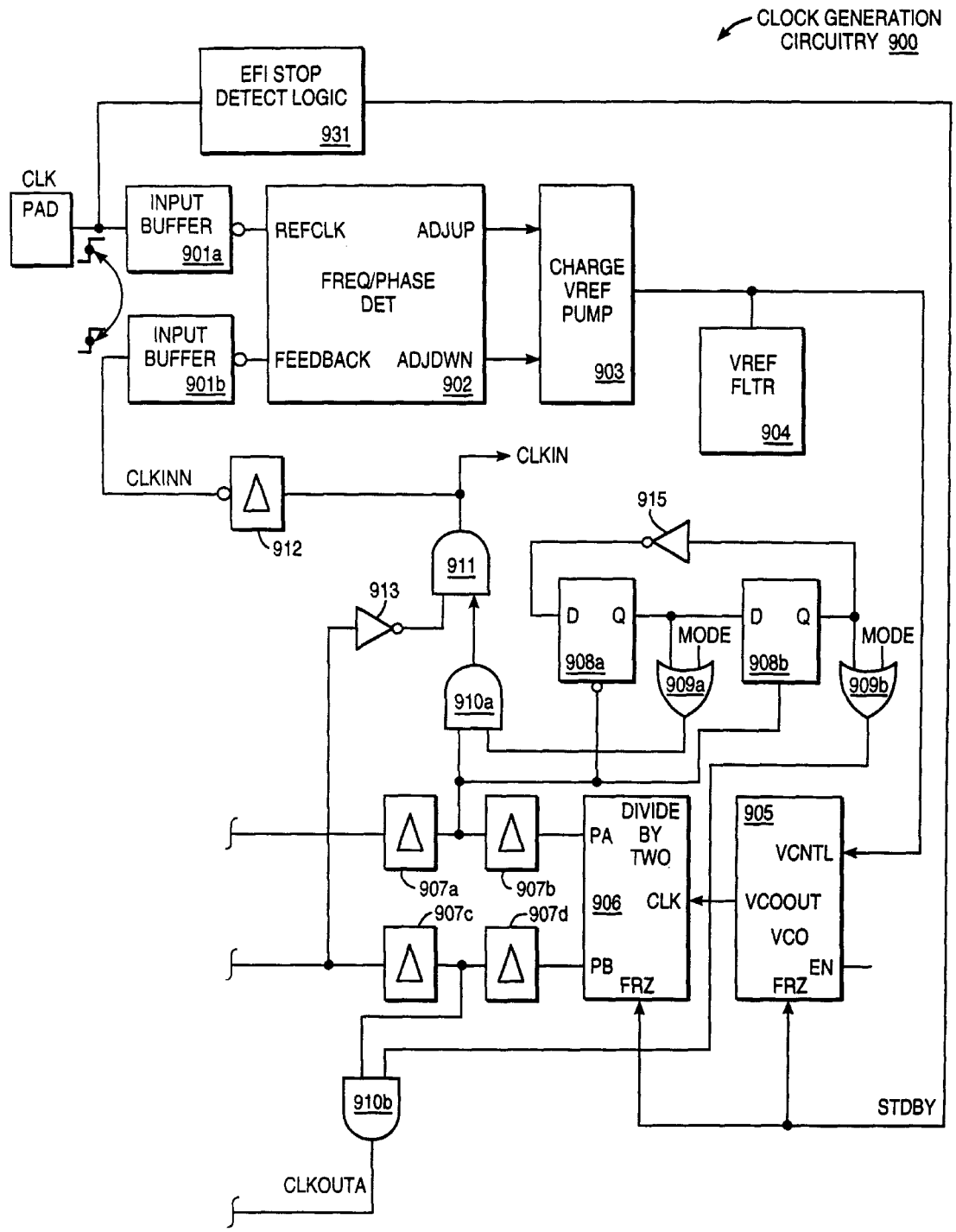
FIG_9B

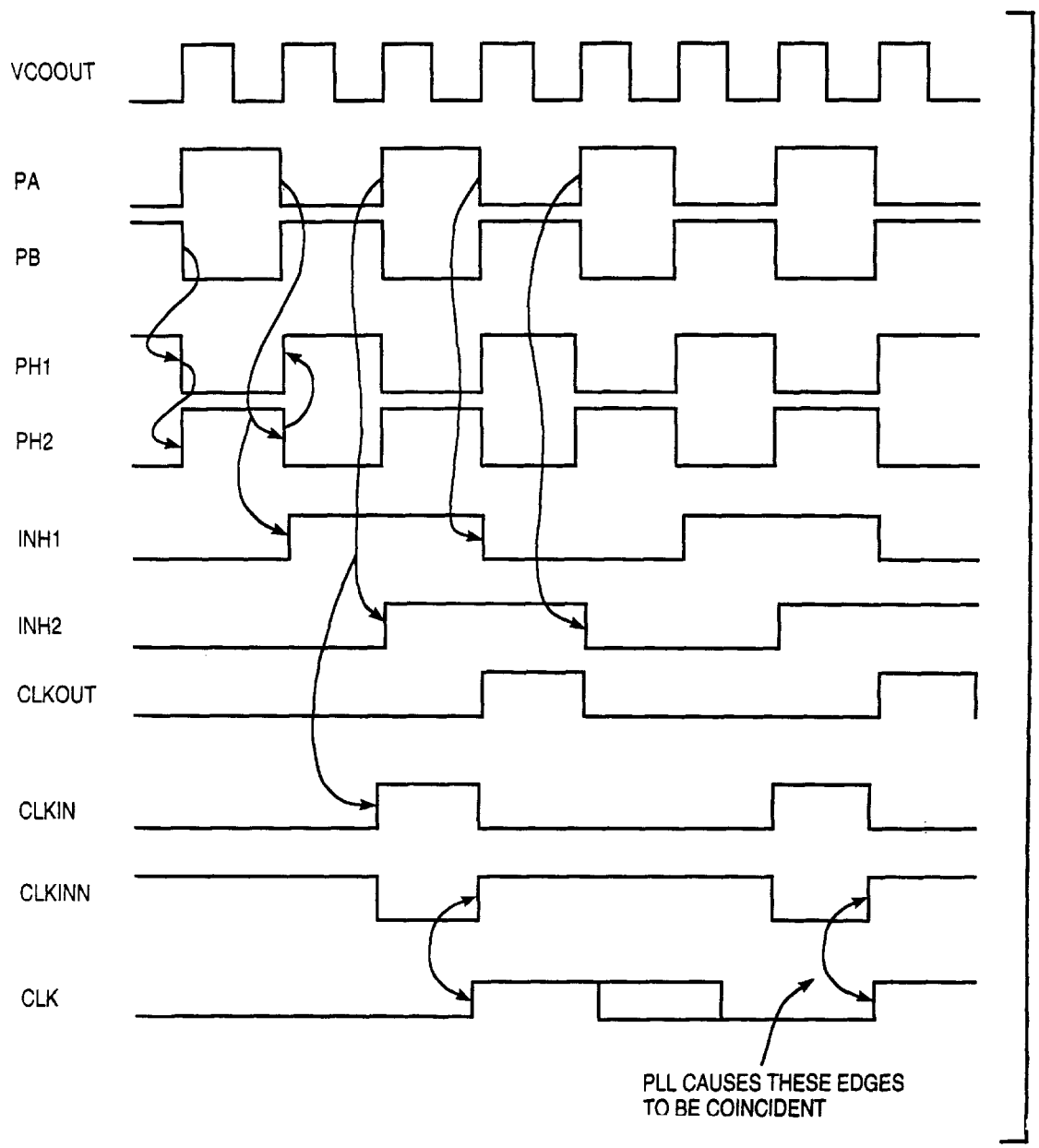
FIG_10

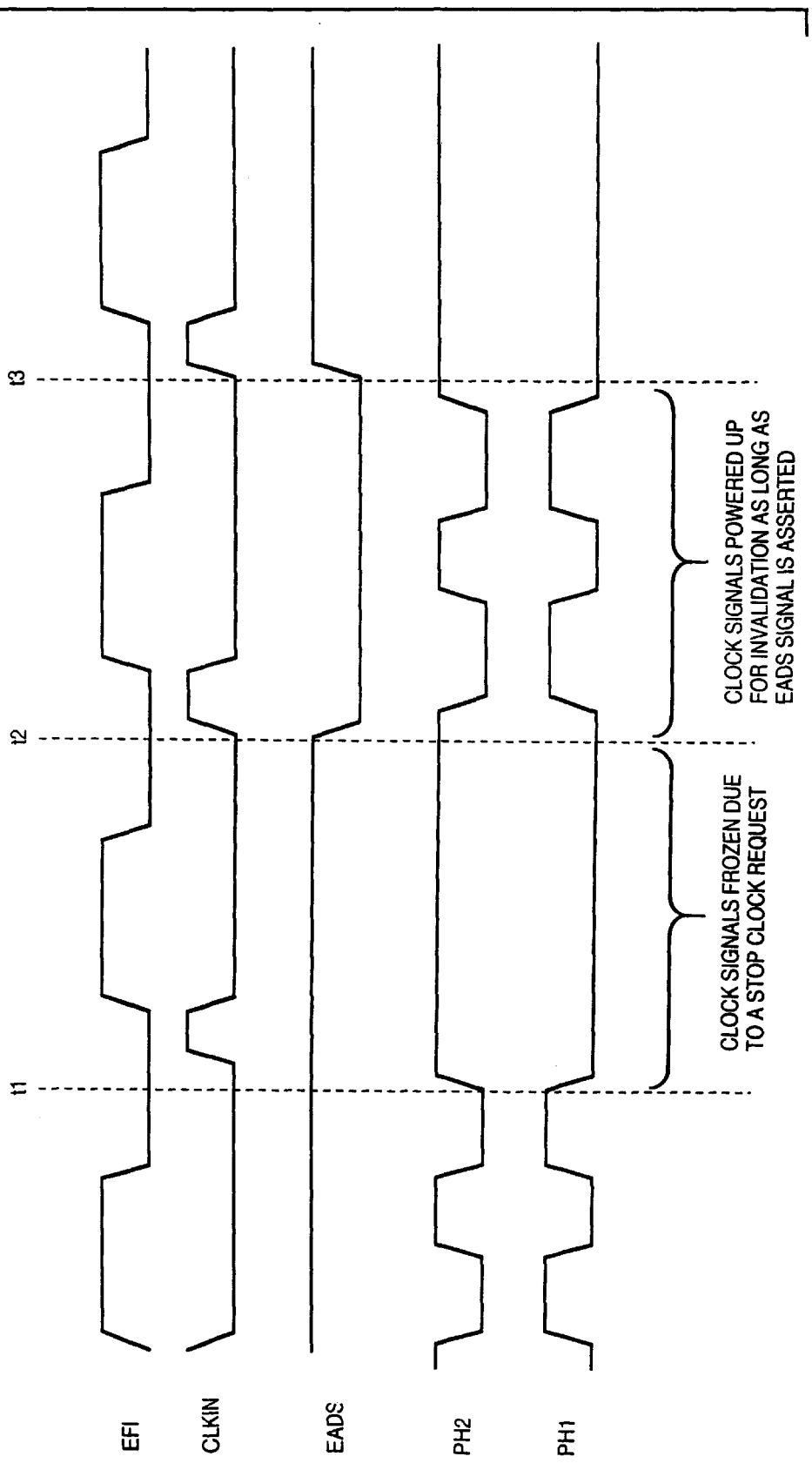

METHOD AND APPARATUS FOR POWERING DOWN AN INTEGRATED CIRCUIT TRANSPARENTLY AND ITS PHASE LOCKED LOOP

This is a continuation of application Ser. No. 08/713,734, filed Sep. 13, 1996, now abandoned which is a continuation of application Ser. No. 08/036,530, filed Mar. 24, 1993, which is a CIP of application Ser. No. 07/778,575, filed Oct. 17, 1991, now abandoned.

FIELD OF THE INVENTION

The present invention relates to the field of computers and computer systems. More specifically, the invention relates to features incorporated within a computer system or within a microprocessor for controlling clocking signals.

BACKGROUND OF THE INVENTION

Typically, a computer system contains a processor, a bus, and other peripheral devices. The processor is responsible for executing instructions using the data in the computer system. The bus is used by the microprocessor and the peripheral devices for transferring information between one another. The information on the bus usually includes data, address and control signals. The peripheral devices comprise storage devices, input/output (I/O) devices, etc. Generally, all operations being performed in the computer system occur at the same frequency.

The microprocessor has a core for processing the data. Since generally all operations performed by the computer system occur at the same frequency, the logic operations performed by the core are at the same frequency as the transfer of data, address and control signals on the computer system bus.

Some logic operations performed by the core, such as arithmetic operations, require multiple cycles to complete. During completion of these multiple cycle operations, the bus remains idle. It is desirable to have the core operate at a faster speed than the bus, so that operations are performed more quickly. In this manner, the bus will be used more frequently, such that bus idle states will be reduced and operations performed more quickly.

The related technologies of computer and microcomputer design have made incredible advances in recent years which have contributed to large gains in performance. One way in which performance has been improved is through the creation of mechanisms to reduce the power consumed by the processor. One technique for this has been to stop the processor regardless of the current instruction being executed. Methods have been employed whereby the processor is stopped on predetermined conditions. Another mechanism used in the prior art causes the processor to stop asynchronously by disabling the externally generated clock signal utilized to generate the internal clock of the device.

A problem with asynchronously disabling the external reference frequency generator involves the fact that most microprocessors and computer systems utilize a phase-locked loop (PLL) circuit to multiply the reference frequency by some factor to generate the system's internal clock rate. The internal clock signal is utilized by the central processing unit (CPU) of the computer during the execution of its various functions and instructions. A problem arises is that if the clock is stopped externally, then the internal phase-locked loop circuitry is likewise disabled. Under such circumstances, re-enabling the external reference frequency does not produce an instantaneous response from the PLL. In other words, the PLL requires some fixed time period (e.g., hundreds of microseconds) to stabilize and achieve lock. During this start-up time period, spurious signals and glitches are commonly generated, leading to unpredictable results. Thus, starting and stopping of the processor's clock by disabling the external reference input frequency results in a loss of pseudo-instantaneous response. What is needed is a means for reducing power consumption in a processor which does not cause a PLL in a computer system to become unstabilized, such that spurious signals and glitches result. That is, it is desirable to have a mechanism for reducing power in a processor which can be utilized such that the remainder of the computer system is unaware of its use (i.e., it is transparent).

One instruction which is executed by the processor is a HALT instruction. The execution of a HALT instruction causes the core of the processor to stop executing user code. Upon the execution of a HALT instruction, the core enters a wait state in which the core sits until an interrupt occurs to the processor, which would cause it to return to normal execution. Note that even though the processor is in a wait state, it is still consuming full power. It is desirable to reduce the power consumption in a computer system following the execution of a HALT signal.

When additional features are integrated in a microprocessor, its use most often requires changes to the computer system to accommodate the new features. These changes could take the form of modifications to the circuit board, including adding extra circuitry. Ideally, new features and faster processing should be added without changing, for example, the mother board of a computer system. It is thus advantageous to modify microprocessors by incorporating new features in such a way as to reduce or dispense with changes to the remainder of the computer system. It is also advantageous to keep the number of hardware changes small so that preexisting computer applications can benefit by upgrading their computer systems without having to acquire new system components, thereby avoiding huge expenditures.

The present invention provides a means for reducing power consumption on an integrated circuit, particularly a processor. The present invention also provides a means for stopping clocks within the processor. However, the present invention also provides a means for reducing the power consumption using a HALT instruction. Moreover, these features are provided, such that changes do not have to be made to the computer system for their use.

SUMMARY OF THE INVENTION

A method and apparatus for powering down a microprocessor in a computer system. The method and apparatus includes a phase locked loop (PLL) circuit means, wherein the phase locked loop generates bus clock signals for clocking the operations on the bus and core clock signals for clocking the core of the processor in response to global clock signal of the computer system. The microprocessor includes circuitry for processing data synchronous with the core clock signals. The method and means also includes circuitry for placing the processor in a reduced power consumption state in response to the execution of a power down instruction. In this manner, the computer system reduces power consumption.

The present invention also includes a method and means for stopping the clock of a microprocessor, which includes executing a power down instruction which indicates that the clock is to be stopped. After the execution of the power down instruction, logic asserts a signal which freezes the core clock signals.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

FIG. 3 illustrates the timing signals generated by the clock generator of the currently preferred embodiment of the present invention for the 1X core mode.

FIG. 4 is a bus state diagram for the 1X core mode.

FIG. 5 illustrates the timing signals generated by the clock generator of the currently preferred embodiment of the present invention for the 2X core mode.

FIG. 6 illustrates one embodiment of the logic circuitry for generating the "prepare for T2 transition" logic signal.

FIG. 7 illustrates one embodiment of the logic circuitry for generating the "unmask readys" logic signal.

FIG. 8 is a bus state diagram for the 2X core mode.

FIGS. 9A and 9B are a circuit schematic of the clock generator of the currently preferred embodiment of the present invention.

FIG. 10 illustrates the timing signals associated with the phase locked loop of the present invention.

FIG. 11 is a block diagram of the circuitry used by the present invention to freeze the core clock signals.

DETAILED DESCRIPTION OF THE INVENTION

A method and apparatus for powering down a phase lock loop is described. In the following description, numerous specific details are set forth such as specific numbers of signals, gates, frequencies, etc., in order to provide a thorough understanding of the present invention. It will be obvious, however, to one skilled in the art that the present invention may be practiced without these specific details. In other instances, well-known computer operations and components have been shown in block diagram form, rather than in detail, to avoid unnecessarily obscuring the present invention.

Overview of the Computer System of the Present Invention

Figure 1:
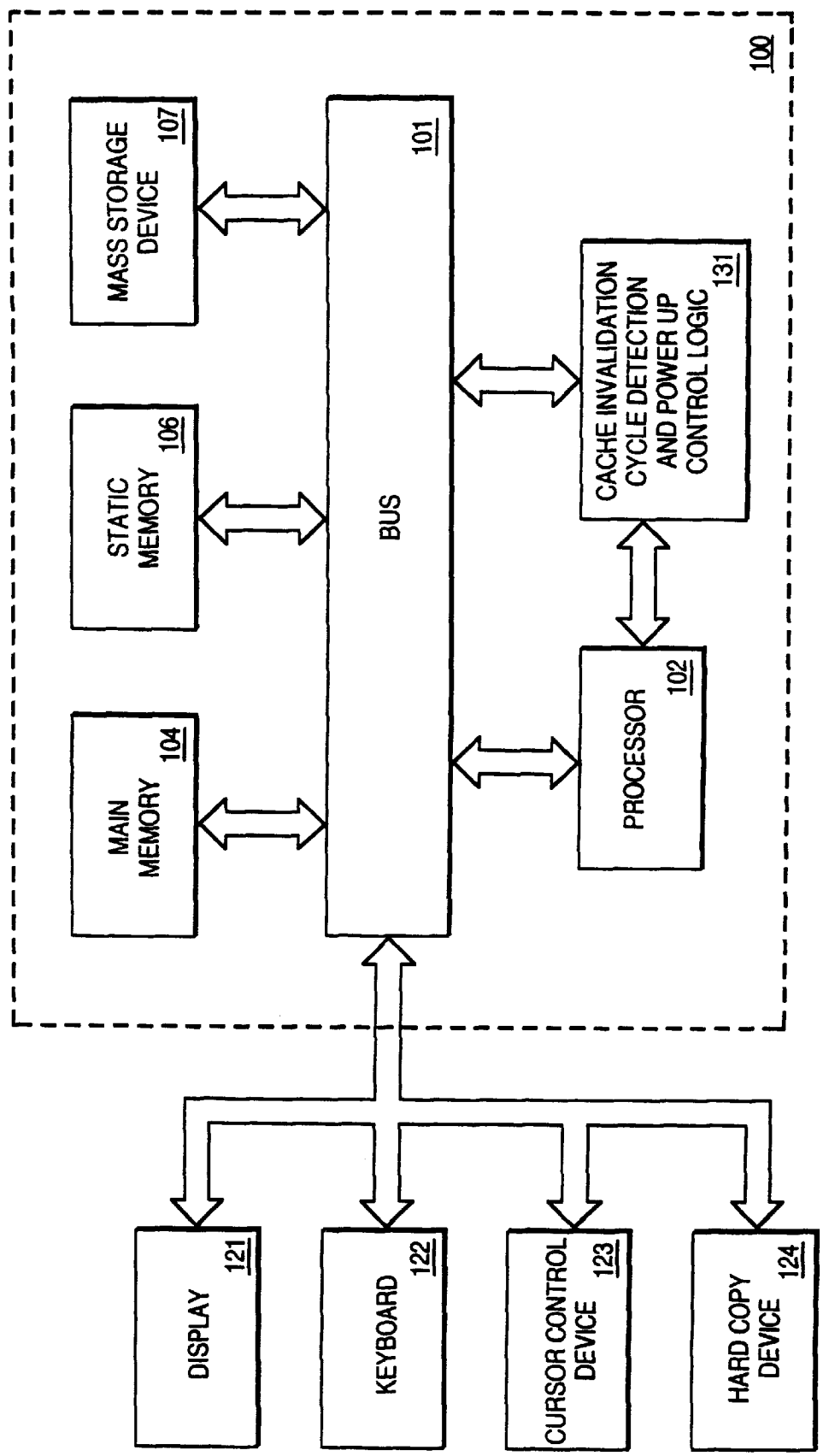
FIG. 1 is a block diagram of the computer system of the present invention.

Referring first to FIG. 1, an overview of a computer system of the present invention is shown in block diagram form. It will be understood that while FIG. 1 is useful for providing an overall description of the computer system of the present invention, a number of details of the system are not shown. As necessary for disclosure of the present invention, further detail is set forth with reference to the other figures provided with this specification. Further, the present invention is described with reference to its preferred embodiment; alternative embodiments which may be conceived by one of ordinary skill in the art are considered within the scope of the claims set forth below.

As illustrated in FIG. 1, a computer system, as may be utilized by the preferred embodiment of the present invention, generally comprises a bus or other communications means 101 for communicating information, a processor 102 coupled with bus 101 for processing information, a random access memory (RAM) or other dynamic storage device 104 (commonly referred to as a main memory) coupled with bus 101 for storing information and instructions for processor 102, a read only memory (ROM) or other static storage device 106 coupled with bus 101 for storing static information and instructions for processor 102, a data storage device 107, such as a magnetic disk and disk drive, coupled with bus 101 for storing information and instructions. Note that in the currently preferred embodiment, processor 102 comprises the 80486DX2 brand microprocessor of Intel Corporation of Santa Clara, Calif.

The computer system also includes a display device 121, such as a cathode ray tube, liquid crystal display, etc., coupled to bus 101 for displaying information to the computer user, an alphanumeric input device 122 including alphanumeric and other keys, etc., coupled to bus 101 for communicating information and command selections to processor 102 and a cursor control device 123 coupled to bus 101 for controlling cursor movement. Moreover, the system includes a hard copy device 124, such as a plotter or printer, for providing a visual representation of the computer images. Hard copy device 124 is coupled with processor 102, main memory 104, static memory 106 and mass storage device 107 through bus 101.

The computer system also includes control logic 103 coupled to bus 101 and processor 102 for powering up and powering down processor 102 upon the occurrence of one or more predetermined events. In one embodiment, control logic 103 monitors processor 102 to determine if a predetermined instruction has been executed, such that one of the results of execution is the powering down of processor 102.

Of course, certain implementations and uses of the present invention may not require nor include all of the above components. For example, in certain implementations a keyboard and cursor control device for inputting information to the system may not be required. In other implementations, it may not be required to provide a display device for displaying information.

Overview of the Processor of the Present Invention

Figure 2:
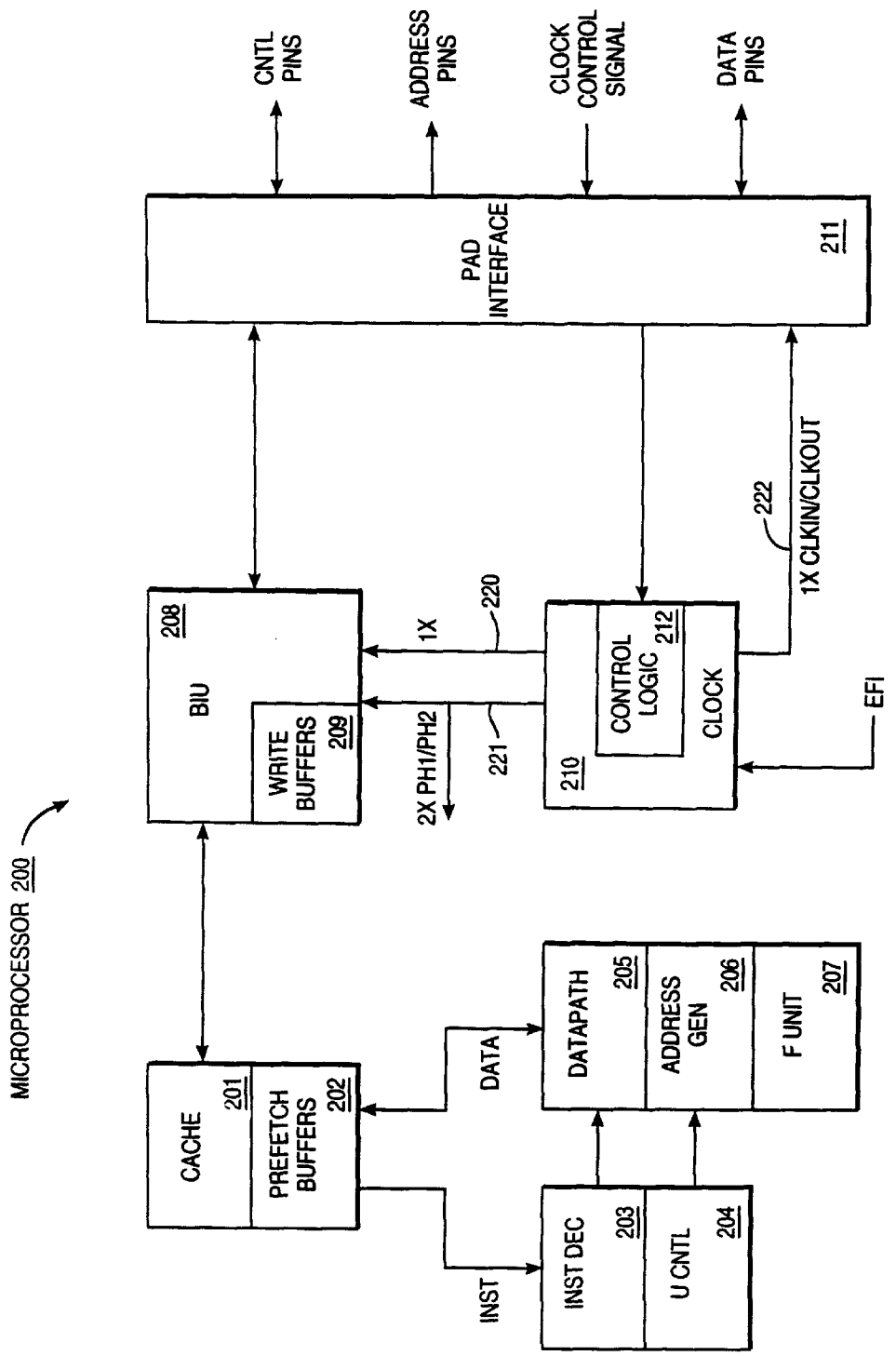
FIG. 2 is a block diagram of the currently preferred embodiment of the microprocessor of the present invention.

FIG. 2 shows a block diagram of the processor, processor 200, utilized by the preferred embodiment of the present invention. Processor 200 is preferably manufactured as an integrated circuit using a metal-oxide-semiconductor (MOS) process. Referring to FIG. 2, processor 200 generally comprises cache 201, prefetch buffers 202, instruction decoder 203, microcode unit 204, datapath 205, address generator 206, floating-point unit 207, bus interface unit (BIU) 208, write buffers 209, clock generator 210 and pad interface 211. All of the units of the processor except the bus controller in BIU 208 constitute the core of processor 200.

Pad interface 211 is coupled to clock generator 210 and BIU 208 and provides a pin interface for control, address and data signals between processor 200 and the remainder of the computer system. BIU 208 includes the bus controller and provides the necessary interface between the internal buses of processor 200, and in particular cache memory 201 and prefetch buffers 202 and the external buses responsible for fetching data from the external data memory system. In the currently preferred embodiment, the present invention uses an external 32-bit address bus and a 32-bit data bus.

BIU 208 is also coupled to write buffers 209 which provide a buffer storage area for data which is to be transferred from processor 200 to the remainder of the computer system. In the currently preferred embodiment, write buffers 209 provide buffer storage for data which is transferred off-chip. BIU 208 is coupled to receive clock signals from clock generator 210 on line 220 and line 221. Note that in the currently preferred embodiment, only those portions of BIU 208 that interface with pad interface 211 operate at the same clock frequency, while the remainder operates at twice the frequency.

Cache 201 stores instructions and data for execution by processor 200. Prefetch buffers 202 is coupled to cache 201 and is responsible for prefetching data and instructions from cache 201 or from BIU 208 for use in execution by processor 200.

Instruction decoder 203 decodes the incoming instructions. Instruction decoder 203 is coupled to receive the instructions from prefetch buffers 202 and sends the decoded instructions, in the form of microcode, to datapath 205 for execution. Microcode unit 204 contains a memory (CROM) which stores the microcode instructions (microcode) for the processor. Microcode unit 204 is coupled to instruction decoder 203 and shares control of instruction execution with instruction decoder 203 in a manner well-known in the art. Microcode unit 204 provides address generator 206 with address information which address generator 206 uses to generate addresses corresponding to data necessary in the execution of the decoded instructions. Address generator 206 provides the addresses for either datapath 205 or floating point 207 depending on the instruction type.

Microcode unit 204 is also responsible for instruction boundary processing, such as interrupt/exception arbitration, and the halting of instruction decoder 203 when necessary. Microcode unit 204 is also responsible for handling most of the freeze conditions, such as cache memory miss, etc.

Datapath 205 is the main execution data path for the processor. Datapath 205 contains the arithmetic logic unit, register file, barrel shifter, constant read-only memory (ROM) and flags. Datapath 205 is coupled to prefetch buffers 202 and requests data from cache 201, via prefetch buffers 202. Datapath 205 executes the microcode provided by instruction decoder 203 using the data received from prefetch buffers 202 according to the addresses generated by address generator 206.

Processor 200 also includes floating point unit 207, which is coupled to address generator 206. Floating point unit 207 contains logic to execute the floating point instructions.

Clock generator 210 generates the clock signals for processor 200. In the present invention, clock generator 210 generates the clock signals in response to an external frequency clock input (EFI) signal, which it is coupled to receive. In the currently preferred embodiment, the EFI clock signal has a frequency of 33 MegaHertz (MHz). Clock generator 210 supplies the clock signals to BIU 208 via bus (i.e., I/O) clock signal line 220 and the remainder of units in processor 200 via core clock signal line 221. Clock generator 210 sends clock signals to pad interface 211 via lines 222. Clock generator 210 includes control logic 212 for controlling the operation of clock generator 210. In the present invention, clock control logic 212 includes logic for disabling and enabling some of the clock signals produced by clock generator 210, such that clock generator 210 does not output those clock signals. Clock control logic 212 is also responsible for controlling the frequency of the core clock signals of line 221 in comparison to the frequency of the bus (i.e., I/O) clock signals 220 and the clock signals 222 output to pad interface 211.

The block diagram of FIG. 2 is realized with ordinary circuits. Control signals not required for an understanding of the present invention are not illustrated in FIG. 2. Additionally, functions not required for an understanding of the present invention are not shown in order to facilitate an understanding of the invention. Note also that some lines may comprise multiple conductors.

Clock Signals of the Present Invention

Clock generator 210 of the present invention provides core clock signals and bus clock signals for processor 200. The core clock signals clock the operations performed by the units which constitute the core, including the bus controller. In the currently preferred embodiment, the core clock signals are referred to as phase one (PH1) and phase two (PH2). The present invention also generates clock signals which are referred to as power up phase one (PUPH1) and power up phase two (PUPH2). The PUPH1 and PUPH2 clock signals are the same as the PH1 and PH2 core clock signals and clock the operation of control logic responsible for placing the processor in and out of a reduced power consumption state (i.e., the powered and powered down states), including any synchronizers that are required. The bus clock signals clock the transfer of data occurring on the computer system bus. Data transfers occur in two clock phases. During an out phase, data is driven out onto the bus, while during an in phase, data is driven into processor 200 from the bus. In the currently preferred embodiment, the bus clock signals generated by clock generator 210 corresponding to the out and in phases are the CLKOUT and CLKIN signals respectively (line 222). Note that in the currently preferred embodiment, all external timing parameters are specified with respect to the rising edge of the external clock input (EFI).

In the present invention, clock generator 210 has multiple modes of operation. In one mode, clock generator 210 is capable of providing core clock signals at the same frequency as the bus clock signals. This is referred to herein as the 1X mode. In another mode, clock generator 210 provides core clock signals at a frequency which is a multiple of the bus clock signals. In other words, clock generator 210 of the present invention is capable of providing core signals which are two times (2X), three times (3X), four times (4X), etc. the frequency of the bus clock signals. In the currently preferred embodiment, clock generator 210 of the present invention provides core clock signals at the same frequency as the bus clock signals in one mode (i.e., the 1X mode) and provides core clock signals at two times (2X) the frequency of the bus clock signals in another mode (i.e., the 2X mode).

In the currently preferred embodiment, in the 1X mode, the core clock signals and the bus clock signals are at the frequency of the EFI, which is 33 MHz. Thus, the bus clock signal, CLKOUT and CLKIN, are the same as the core clock signals, PH1 and PH2 and the PUPH1 and PUPH2 clock signals (with the exception of a small delay). In the currently preferred embodiment, in the 2X mode, the core clock signals are at 66 MHz and the bus clock signals are at 33 MHz. To reiterate, the core clock signals control the operation of the core of processor 200 including the bus controller in BIU 208. Thus, in the currently preferred embodiment, during the 2X mode, all portions of the core are operating at 2X the input clock frequency (i.e., EFI) including the bus controller. Only a small portion of BIU 208 has an indication that the bus is operating at the same frequency of the EFI (e.g., 33 MHz).

The mode of clock generator 210 is determined according to a clock control signal. In the currently preferred embodiment, the clock control signal indicates whether clock generator 210 operates in the 1X or 2X mode. In the currently preferred embodiment, the 1X/2X clock control signal is derived from a bond option. This selectability allows a single die to fulfill the requirements of a number of processor types using wire bond programming of the clock control signal bond pad. In the currently preferred embodiment, by wiring the bond pad, clock generator 210 can be set to operate only in either the 1X mode or can be set to operate in the 2X mode. Note that the clock control signal could be derived by other means.

In order for a processor to be able to operate at both 1X and 2X modes of operation, the bus input and output clock implementation has a particular timing relationship, which allow for a straightforward 1X bus frequency to 2X core frequency interface. To reiterate, in 2X mode, the core and the bus controller operate at twice the input clock frequency. It should be noted that in the present invention, the bus controller operates at 2X the input clock frequency to allow the write buffers to be loaded at a rate of up to one load per core clock. Therefore, the write buffers are loaded whether or not the bus is ready and each write is completed as the bus becomes available. In this manner, the core is able to continue operating without having to wait for the slower bus. Also in the currently preferred embodiment of the present invention, in order to make the 1X bus to 2X core interface straightforward, the architecture of processor 200 is designed in a such a manner as to provide a very contained 1X/2X boundary. The boundary between the 1X bus and 2X core is contained by interfacing BIU 208 with cache 201 only.

With respect to the clock signals, in the 2X mode of the present invention, the core PH1 and PH2 signals (and the PUPH1 and PUPH2 clock signals) have a timing relationship with respect to the CLKIN and CLKOUT bus clock signals, such that the I/O buffers can communicate properly with the core of the processor. In the 2X mode of the currently preferred embodiment, the CLKOUT and CLKIN signals are quarter duty cycle and are offset with respect to each other. That is, during the 2X mode, bus clock signals, CLKOUT and CLKIN, are quarter duty cycle clock signals that are synchronized with every other core clock signal PH1 and PH2 respectively. In the currently preferred embodiment, since the original phase high time of the 2X mode core phases, PH1 and PH2, are utilized by the 1X mode bus clock signals, CLKOUT and CLKIN, and the phases of the bus clock signals are aligned with the beginning and ending of the 2X core clock signals, the circuitry required to drive the half speed bus is reduced.

Note that quarter duty cycles are distinguished from half duty cycles in which the high and low times for the signal are equal. In quarter duty cycle signals, the high and low times for the signal are not even, such that the high or low time is only one quarter the total time for a high/low transition. Note that in the present invention, the pulse width of the core clock signal is the same as the pulse width of the bus clock signals regardless of whether the core clock signals are 1X, 2X, 3X, 4X, etc., the frequency of the bus clock signals.

The Clock Signals of the Present Invention

The timing signals generated by the currently preferred embodiment of clock generator 210 during 1X mode are shown in FIG. 3. Referring to FIG. 3, the input clock signal CLK (i.e., EFI) is shown. PH1 and PH2 are the 1X core clock signals. Note that the PUPH1 and PUPH2 clock signals are not shown but are the same as the PH1 and PH2 core clock signals. The CLKOUT and CLKIN signals are the bus clock signals that are synchronized with every other PH1 and PH2 core clock signal respectively.

FIG. 3 also shows the BUS STATE for the computer system of the present invention during 1X mode. The bus cycle starts at T1 when the addresses are driven out onto the computer system bus when the CLKOUT signals transition high. The bus controller then uses logic to set up a transition from T1 to T2 during the PH2 core clock signals of T1. At the start of T2, data is driven onto the computer system bus when the CLKOUT signal transitions high if the cycle is a write cycle; otherwise, nothing occurs during the CLKOUT high state. During T2, data is returned from the computer system bus during the CLKIN phase. The data is used if a ready signal indicates that the data is good. At this state, the bus controller can transition to either new T2, a new T1 or an idle state depending on the cycle type. FIG. 4 illustrates the bus state diagram for the 1X core mode. Referring to FIG. 4, state T1 corresponds to the idle state, such that while the processor is idle or enters the idle state the bus state transitions to state T1. The bus state machine transitions to state T1 when a request is pending. This occurs at the first clock cycle of a bus cycle. As stated above, in the T1 state, addresses are driven out onto the computer system bus when CLKOUT goes high. From the T1 state, the state machine transitions to the T2 state at the second or subsequent clock cycle of a bus cycle. Once in the T2 state, if the cycle is a write cycle, then the data is driven onto the computer system bus when CLKOUT transitions. If the cycle is a read cycle, data is returned from the system bus during CLKIN. Also, during the T2 state, the ready signal is sampled. If the ready signal is asserted and no request for the bus is pending, then the state machine transitions to the T1 state. If the ready signal is asserted and a bus request is pending, then the state machine transitions to the T1 state.

The timing signals generated by the currently preferred embodiment of clock generator 210 during 2X mode are shown in FIG. 5. Referring to FIG. 5, the input clock signal CLK (i.e., EFI) is shown. The PH1 and PH2 are the core clock signals. Note that the PUPH1 and PUPH2 clock signals are not shown but are the same as the PH1 and PH2 core clock signals. The CLKOUT and CLKIN signals are quarter duty cycle bus clock signals.

Note that the CLKOUT and CLKIN signals are synchronized with every other PH1 and PH2 core clock signal respectively.

FIG. 5 also shows the BUS STATE for the computer system of the present invention. The bus cycle starts at T1 ADDRESS when the addresses are driven out onto the computer system bus when the CLKOUT signals transition high. It should be noted that T1 is split into two states, T1 ADDRESS and T1 END. This effectively adds a wait cycle to T1. The present invention includes logic to prevent the bus controller from realizing that it is in T1 during the T1 ADDRESS time. At T1 END, the bus controller determines that it is in T1. For this case, when the core is operating at twice the speed of the bus, if the bus controller were not modified, it would attempt to transition from T1 ADDRESS to T2 instead of T1 END. The bus controller now sets up a transition from T1 to T2 during the PH2 core clock signals of T1 END. At the start of T2 DATA, data is driven onto the computer system bus when the CLKOUT signal transitions high if the cycle is a write cycle; otherwise, nothing occurs during the CLKOUT high state. During T2 END, data is returned from the computer system bus during the CLKIN phase. The data is used if a ready signal indicates that the data is good. At this state, the bus controller can transition to either new T2, a new T1 or an idle state depending on the cycle type.

The bus controller of the present invention is modified with the addition of a holdoff signal which holds off the initiation of the transition from the T1 state to the T2 state until the end of T1 END. In the present invention, the hold off is accomplished with the addition of "prepare for T2 transition" logic signal, which is shown in FIG. 5. The timing of the external ready signals is critical to the operation of the state machines of the bus controller. Furthermore, in the present invention, circuitry masks ready inputs until the "unmask readys" period occurs as shown in FIG. 5. The additional logic required to accomplish the hold off is very minimal. Using the hold off circuitry allows the present invention to interface processor 200 with the computer system bus in 2X mode without having to include additional output drivers and input latches.

FIG. 6 illustrates one embodiment of the "prepare for T2 transition" holdoff logic. Referring to FIG. 6, logic 600 comprises D flip-flops 604–607, AND gates 601, 603 and 608, inverter 602 and OR gate 609. One input to AND gate 601 is the 2X/1X core mode indication signal. The other input is the new bus cycle signal which indicates when a new bus cycle occurs. The output of AND gate 601 is coupled to the D input of flip-flop 605. The enable input (E) of flip-flop 605 is also coupled to the CLKOUT bus clock signal. Flip-flop 605 is clocked by the PH1 core clock signal. The Q output of flip-flop 605 is coupled to the D input of flip-flop 606, which is clocked by the PH2 core clock signal. The Q output of flip-flop 606 is coupled to the D input of flip-flop 607, which is clocked by the PH1 core clock signal. The Q output of flip-flop 607 is coupled to one of the inputs of AND gate 608. The other input to AND gate 608 is coupled to the output of flip-flop 605. The output of AND gate 608 is coupled to one of the inputs of OR gate 609. The other input to OR gate 609 is coupled to the Q output of flip-flop 604, which is clocked by the PH1 core clock signal. The D input of flip-flop 604 is coupled to the output of AND gate 603. One input to AND gate 603 is coupled to new bus cycle indication signal. The other input to AND gate 603 is coupled to the output of inverter 602. The input of inverter 602 is coupled to the 2X/1X mode indication signal. The output of OR gate 609 is the "prepare for T2 transition" logic signal.

The 2X/1X signal controls the outputs of AND gates 601 and 603. When the 2X/1X signal is low, indicating that the processor is in 1X mode, the output of AND gate 603 is enabled, via inverter 602, and the output of AND gate 601 is disabled. When the 2X/1X signal is high, indicating that the processor is in 2X mode, the output of AND gate 601 is enabled and the output of AND gate 603, via inverter 602 is disabled. Thus, AND gates 601 and 608 in conjunction with flip-flops 605–607 comprises the 2X path for logic 600, while AND gate 603, inverter 602 and flip-flop 604 form the 1X path.

If the 2X/1X signal indicates that the processor is operating in 1X mode, the output of AND gate 603 will be high when a new bus cycle occurs (as indicated by the new bus cycle input to AND gate 603). The new bus cycle signal is a function of the PH2 core clock signal. Thus, when the new bus cycle occurs, the D input to flip-flop 603 is high. When the D input to flip-flop 603 is high, the Q output of flip-flop 603 goes high after the next assertion of the PH1 core clock signal. The Q output of flip-flop 603 represents the T1 state during the 1X mode of operation. The Q output always being high causes the output of OR gate 609 to be high. Thus, in the 1X mode, the "prepare for T2 transition" signal is always high.

If the 2X/1X signal indicates that the processor is operating in 2X mode, then the output of AND gate 601 is high. The output of AND gate 601 is received into the D input of flip-flop 605 and causes the Q output (at node A) to change state when the CLKOUT and PH1 signals are asserted. The output of flip-flop 605 propagates through flip-flops 606 and 607 on successive assertion of the PH2 and PH1 clock signals respectively. Until the Q output of flip-flop 607 (at node C) goes high, the output of AND gate 608 will be low. Thus, when the Q output of flip-flop 605 propagates through flip-flops 606 and 607, then the output of AND gate 608 will go high. The output of AND gate 608 being high represents the T1 END bus state. The high output of AND gate 608 also causes the output of OR gate 609 to go high, such that the "prepare for T2 transition" logic signal is high.

FIG. 7 illustrates one embodiment of the "unmask readys" holdoff logic. Referring to FIG. 7, logic 700 comprises D flip-flops 701, 703, 705 and 706, AND gates 702, 707 and 709, inverters 704 and 710 and OR gate 708. The T2 state signal is coupled to one input of AND gate 702. The other input to AND gate 702 is coupled to the output of inverter 704. The output of AND gate 702 is coupled to the D input of flip-flop 703, which is clocked by the PH2 core clock signal. The Q output of flip-flop 703 is coupled to the D input of flip-flop 705, which is clocked by the PH1 core clock signal. The Q output of flip-flop 705 is coupled to the input of inverter 704 and the D input of flip-flop 706, which is clocked by the PH2 core clock signal. The Q output of flip-flop 706 is coupled to one input of AND gate 707. The other input to AND gate 707 is coupled to the 2X/1X mode indication signal. The output of AND gate 707 is coupled to one input of OR gate 708. The other input to OR gate 708 is coupled to the output of AND gate 709. The inputs to AND gate 709 are coupled to the output of inverter 710 and the Q output of flip-flop 701, which is clocked by the PH2 core clock signal. The input of inverter 710 is coupled to the 2X/1X mode indication signal. The input of flip-flop 701 is coupled to the T2 state signal. The output of OR gate 708 is the "unmask readys" signal.

The "unmask readys" logic 700 generates the "unmask readys" signal. The 2X/1X mode selection signal controls which source input drives the output of OR gate 708, which is the "unmask readys" logic signal. If the 2X/1X mode selection signal indicates that the processes is in 1X mode, the output of AND gate 707 will be disabled and the output of AND gate 709 will be enabled, via inverter 710. If the 2X/1X mode selection signal indicates that the processor is operating in 2X mode, then the output of AND gate 707 will be enabled and the output of AND gate 709 will be disabled, via inverter 710. Thus, the 2X/1X mode selection signal indicates whether the output of OR gate 708 will be derived from flip-flop 701 or from the combination of AND gate 702, inverter 704 and flip-flops 703, 705 and 706.

If the 2X/1X signal is low, indicating that the processor is in 1X mode, then the "unmask readys" signal will be high whenever the Q output of flip-flop 701 is high. When the bus state machine transitions into the T2 state, the T2 signal is asserted. Note that the T2 signal is a function of the PH1 core clock signal. When the next PH2 core clock signal is asserted, the high T2 input causes the Q output of flip-flop 701 to go high, such that while the bus state machine is in state T2 the output of OR gate 709 is high. Thus, the "unmask readys" signal is high.

If the 2X/1X signal is high, indicating that the processor is in 2X mode, then the "unmask readys" signal will be high whenever the Q output of flip-flop 706 is high. The output of flip-flop 706 is high when its D input is high and the PH2 core clock signal is asserted. The D input of flip-flop 706 will be high when the output of AND gate 702 is high and a PH2 and PH1 clock pulses are asserted in succession by flip-flops 703 and 705. The output of AND gate 702 is high when the T2 signal is high and when the output of inverter 704 is high. Before the bus state machine transitions into the T2 state, the output of flip-flop 705 is low, such that the output of inverter 704 is high. Thus, when the bus state machine transitions into the T2 state and the T2 signal goes high, the output of AND gate 702 goes high. Then after the assertion of the PH2, PH1 and PH2 core clock signals in succession, the high output from AND gate 702 propagates through flip-flops 703, 705 and 706 respectively, thereby causing the output of OR gate 708 to go high. In this manner, the "unmask readys" signal is asserted.

Note, however, that once the signal propagates through flip-flop 705, the output of inverter 704 goes low, thereby causing the output of AND gate 702 to go low. When this occurs, the "unmask readys" signal will go low after successive PH2, PH1 and PH2 core clock pulses. The feedback from the output of flip-flop 705 to the input of AND gate 702, via inverter 704, is required when multiple back to back T2 states occur, such as during burst cycles.

In the currently preferred embodiment, the holdoff signal is generated by a holdoff generator in the bus controller. In the currently preferred embodiment, the holdoff signal asserts when CLKOUT is asserted and remains asserted for two core clock phases. This prevents the bus controller from transitioning prematurely. FIG. 8 illustrates a bus state diagram for the 2X mode. Referring to FIG. 8, Ti ADDRESS and T1 END represents the idle state when the bus is idle. The bus state machine transitions from the Ti ADDRESS state to the Ti END state when the second core PH1 clock signal of the current cycle has started. The bus state machine transitions from the Ti END state to the T1 ADDRESS state at the start of the first clock cycle of a bus cycle when a request for the bus is pending. During the T1 ADDRESS state, the addresses are driven out from the processor when the CLKOUT bus clock signal goes high. The bus state machine transitions to the T1 END state when the second core PH1 clock signal of the current clock cycle has started. During the T1 END state, the bus controller sets up for a transition into state T2. The bus state machine transitions between the T1 END state and the T2 DATA State at the start of the second or subsequent clock cycles of a bus cycle. In the T2 DATA state, if the bus cycle is a write cycle, then the data is driven onto the computer system bus when the CLKOUT bus clock signal transitions. The bus state machine transitions from the T2 DATA state to the T2 END state when the second core PH1 clock of the current clock cycle has started. During the T2 END state, if the bus cycle is a read cycle, the data is returned from the system bus during the CLKIN bus clock. Also, during the T2 END state, the ready signals are unmasked and sampled. If a ready signal is asserted and no bus request is pending, then the state machine transitions from the T2 END state to the Ti Address state. If a ready signal is asserted and a request is pending, then the bus state machine transitions from the T2 END state to the T1 ADDRESS state.

In the currently preferred embodiment, the holdoff generator is activated using the 1X/2X signal. In the currently preferred embodiment, an AND gate enables and disables the holdoff generator using the 1X/2X selection signal, wherein the AND gate outputs a logical zero when processor 200 is in 1X mode, which disables the holdoff signal.

Overview of the Clock Generator of the Present Invention

In the currently preferred embodiment of the present invention, the clock generator includes a phase locked loop (PLL), as shown in FIGS. 9A and 9B. The PLL generates both the PH1 and PH2 core clock signals, the PUPH1 and PUPH2 clock signals, the CLKOUT and CLKIN bus clock signals and the PUCOUT clock signal. In the currently preferred embodiment, the PLL is a 4X phase locked loop which is capable of generating the PH1 and PH2 core clock signals (as well as the PUPH1 and PUPH2 clock signals) at one time or two times the frequency of the bus clock signals (and the external clock input signal). Although the PLL in the currently preferred embodiment is capable of generating core clock signals at twice the frequency of the frequencies of the bus clock signals, the core clock signals of the present invention could be provided at frequencies which are multiples (2X, 3X, 4X, etc.) of the bus clock signals.

Referring to FIGS. 9A and 9B, clock generator circuitry 900 comprises input buffers 901A and B, frequency phase detector 902, charge pump 903, loop filter 904, voltage-controlled oscillator (VCO) 905, a divide-by-two circuit 906, delays 907A–D and 912, D flip-flops 908A and 908B, inverters 913, 915 and 942, OR gates 909A and 909B, AND gates 910A, 910B, 911 and 941, PH2/PH1 circuitry 914, PH2/PH1 circuitry 924, control logic 930, and EFI stop detect circuit 931.

Input buffers 901 A and B buffer the signals on their inputs and output the signals in inverted form. The purpose of the buffers is to align the positive edges of their input signals so that frequency phase detector 902 can determine the phase difference between the two signals. Phase detector 902 only examines the buffered negative edges of the signals. The input of input buffer 901A is coupled to the input clock, CLK. In the currently preferred embodiment, CLK is a 33 MHz input to the processor from an external clock source. The output of buffer 901A is coupled to the REFCLK input of frequency phase detector 902. The input to input buffer 901 B is coupled to delay 912. The input represents the feedback signal for the PLL in clock generator 900. The output of buffer 901B is coupled to the Feedback input of frequency phase detector 906.

Phase detector 902 compares the input frequencies from input buffers 901A and B and generates an output that is the measure of the phase difference between the signals. Phase detector 902 has two outputs. The ADJUP output is coupled to one of the inputs of charge pump 903. The ADJDWN output is coupled to the other input of charge pump 903. The ADJUP and ADJDWN outputs are generated when the edges of the feedback signal CLKINN lags or leads the edges of the CLK signal respectively.

Charge pump 903 is coupled to loop filter 904 and the VCNTL input of VCO 905. Charge pump 903 generates a charging or discharging current and supplies it to the capacitive elements of loop filter 904 in response to the ADJUP or ADJDWN pulses from phase detector 902 respectively. This current charges or discharges the capacitive elements in loop filter 904, generating a control voltage. The control voltage indicates the extent of difference between the input frequency of CLK signal and the feedback signal CLKINN. The control voltage is coupled to the VCNTL input of VCO 905.

VCO 905 receives the control voltage and an enable signal EN and produces VCOOUT. The VCOOUT output of VCO 905 is coupled to the CLK input of divide-by-two 906. VCO 905 is enabled when the computer system is powered up. When enabled, VCO 905 generates a frequency VCOOUT in response to the control voltage. If the frequency of the CLK signal does not equal the frequency of the feedback signal CLKINN, the frequency generated by VCO 905 deviates in the direction of the frequency of the CLK signal.

Divide-by-two 906 produces two outputs, PA and PB. These outputs are half the frequency of the output VCOOUT of VCO 905 and are non-overlapping pulses. The outputs PA and PB are coupled to delays 907B and 907D respectively. In the currently preferred embodiment, delays 907B and 907D comprise inverters. The output of delay 907B is coupled to delay 907A, one of the inputs to AND gate 910A, and the clock inputs to D flip-flops 908A and B. The output of delay 907D is coupled to the input of delay 907C and one of the inputs of AND gate 910B. In the currently preferred embodiment, delays 907A–D comprise inverters.

D flip-flop 908A generates a Q output in response to being clocked by the PA output signal of divide-by-two 906 that is buffered through delay 907B. The Q output of D flip-flop 908A is coupled to one input of OR gate 909A. The other input of OR gate 909A is coupled to the MODE signal. The Q output of D flip-flop 908B is coupled to the input of inverter 915. The output of inverter 915 is coupled to the D input of D flip-flop 908A. The Q output of D flip-flop 908A is also coupled to D input of D flip-flop 908B.

The Q output of D flip-flop 908B is also coupled to one of the inputs to OR gate 909B. The other input to OR gate 909B is coupled to the MODE signal. The outputs of OR gate 909A and 909B are coupled to inputs of AND gates 910A and 910B respectively. The output of AND gate 910B is the CLKOUTA signal. The output of AND gate 910A is coupled to one of the inputs of AND gate 911. The other input of AND gate 911 is coupled to the output of inverter 913. The output of AND gate 911 is the CLKIN signal. The output of AND gate 911 is also coupled to the input of delay 912. In the currently preferred embodiment, delay 912 comprises a series of inverters. The output of delay 912 is inverted and coupled to the input of buffer 901B.

The outputs of delays 907A and 907C are coupled to two inputs of control circuitry 930. The output of delay 907A is coupled to one input of OR gate 933. The other input of OR gate 933 is coupled to the output of AND gate 932. The inputs of AND gate 932 are coupled to the EADSN signal and the output of OR gate 931. The inputs of OR gate 931 are coupled to the SRLPD signal and the UNDC signal. The output of OR gate 933 is the EPH2 signal output from control circuitry 930 for input to PH1/PH2 circuitry 914. The output of delay 907C is coupled to one input of AND gate 937. The other input of AND gate 937 is coupled to the output of OR gate 936. The inputs of OR gate 936 are coupled to the outputs of inverters 934 and 935. The input of inverter 934 is coupled to the output of OR gate 931. The input of inverter 935 is coupled to the EADSN signal. The output of AND gate 937 is the EPH1 output of control circuitry 930 for input to PH1/PH2 circuitry 914.

PH1/PH2 circuitry 914 receives the EPH2 and EPH1 as inputs and produces the core clock phase signal, PH2, and the core clock phase signal, PH1. Referring to FIGS. 9A and 9B, the EPH2 input is coupled to the input of inverter 914F and the gate of p-channel transistor 914A. The source of transistor 914A is coupled to Vcc. The drain of transistor 914A is coupled to the gate of p-channel transistor 914B, the drain of transistor 914D and the source of transistor 914C. The gate of transistor 914D is coupled to Vcc, and the source is coupled to the PH1 output. The gate of transistor 914C is coupled to ground and its drain is coupled to the PH1 output. The source of transistor 914B is coupled to Vcc and its drain is coupled to the PH2 output and the drain of n-channel transistor 914E. The gate of transistor 914E is coupled to the output of inverter 914F. The source of transistor 914E is coupled to ground. The EPH1 input is coupled to the input of inverter 914I and the gate of p-channel transistor 914G. The source of transistor 914G is coupled to Vcc. The drain of transistor 914G is coupled to the gate of p-channel transistor 914H, the drain of transistor 914J and the source of transistor 914I. The gate of transistor 914J is coupled to Vcc, and the source is coupled to the PH2 output. The gate of transistor 914I is coupled to ground and its drain is coupled to the PH2 output. The source of transistor 914H is coupled to Vcc and its drain is coupled to the PH1 output and the drain of n-channel transistor 914K. The gate of transistor 914K is coupled to the output of inverter 914I. The source of transistor 914K is coupled to ground. The purpose of circuitry 914 is to ensure that the PH2 and PH1 signals do not overlap. Functionally, circuitry 914 allows one signal to go low before the other goes high. The operation of this implementation is well-known in the art.

The outputs of delays 907A and 907C are also coupled to two inputs of PH1/PH2 circuitry 924. With respect to PH1/PH2 circuitry 924, delay 907A is coupled to the gate of p-channel transistor 924A and the input of inverter 924F. The output of delay 907C is coupled to the gate of p-channel transistor 924G and the input of inverter 924I of PH1/PH2 circuitry 924. PH1/PH2 circuitry 924 produces the clock phase 2 signal, PUPH2, and the clock phase 1 signal, PUPH1. The output from delay 907A is coupled to the input of inverter 924F and the gate of p-channel transistor 924A. The source of transistor 924A is coupled to Vcc. The drain of transistor 924A is coupled to the gate of p-channel transistor 924B, the drain of transistor 924D and the source of transistor 924C. The gate of transistor 924D is coupled to Vcc, and the source is coupled to the PUPH1 output. The gate of transistor 924C is coupled to ground and its drain is coupled to the PUPH1 output. The source of transistor 924B is coupled to Vcc and its drain is coupled to the PUPH2 output and the drain of n-channel transistor 924E. The gate of transistor 924E is coupled to the output of inverter 924F. The source of transistor 924E is coupled to ground. The output of delay 907C is coupled to the input of inverter 924I and the gate of p-channel transistor 924G. The source of transistor 924G is coupled to Vcc. The drain of transistor 924G is coupled to the gate of p-channel transistor 924H, the drain of transistor 924J and the source of transistor 924I. The gate of transistor 924J is coupled to Vcc, and the source is coupled to the PUPH2 output. The gate of transistor 924I is coupled to ground and its drain is coupled to the PUPH2 output. The source of transistor 924H is coupled to Vcc and its drain is coupled to the PUPH1 output and the drain of n-channel transistor 924K. The gate of transistor 924K is coupled to the output of inverter 924I. The source of transistor 914K is coupled to ground. The purpose of circuitry 924 is to ensure that the PUPH2 and PUPH1 signals do not overlap. Functionally, circuitry 924 allows one signal to go low before the other goes high. The operation of this implementation is well-known in the art.

The CLKOUTA output of AND gate 910B is coupled to the inputs of inverter 942 and one input of AND gate 941. The other input of AND gate 941 is coupled to the output of OR gate 936. The output of AND gate 941 is the CLKOUT clock signal. The output of inverter 942 is the PUCOUT clock signal. Note that the PUCOUT signal is used to clock the output of a HOLD Acknowledge signal (not shown) which is used to acknowledge that the processor recognizes the hold state that has been placed on the computer system bus. In the currently preferred embodiment, the hold state of the bus is indicated to the processor of the present invention by a HOLD signal. The use and operation of HOLD signal and hold acknowledge (HOLDA) signals is well-known in the art.

The EFI stop detect circuit 931 is coupled to the CLK input of the phase locked loop. The output of EFI stop detect circuit 931 is coupled to VCO 905 and divide-by-two 906.

Operation of the Clock Generation Circuitry of the Present Invention

In the present, clock generation circuitry 900 produces core clock signals, PH2 and PH1, and bus clock signals, CLKIN and CLKOUT, in response to an input CLK signal (i.e., EFI). The CLK signal is received into clock generator 210 of processor 200 (FIG. 2). The signal is buffered by input buffer 901 A and enters phase detector 902 with the buffer feedback signal CLKINN (also buffered). Phase detector 902 outputs either an adjust up, ADJUP, or an adjust down, ADJDWN, signal. Charge pump 903 receives the signals and generates a charging or discharging current and supplies it to the capacitive elements of loop filter 904. This current charges or discharges the capacitive elements in loop filter 904, generating a control voltage. The control voltage produced is coupled to the VCNTL input to VCO 905.

The control voltage drives the output of VCO 905. As the control voltage increases, the frequency output by VCO 905 gets higher. As the control voltage decreases, the frequency output by VCO 905 gets lower. The output of VCO 905 is input into divide-by-two 906. Divide-by-two 906 divides the output frequency of VCO 905 to produce two outputs, PA and PB, wherein every rising edge of the CLK signal produces an edge, both rising and falling, for the output signal. These outputs are half the frequency of the output VCOOUT of VCO 905 and are non-overlapping pulses.

The PA and PB signals are the drivers for the PH2 and PH1 core clock signals respectively. The PA signal is delayed by delays 907B and 907A and is then input into control circuitry 930. The PB output signal is delayed by delay 907D and then is input into control circuitry 930. Control circuitry 930 outputs the EPH2 and EPH1 inputs to PH1/PH2 circuitry 914. The outputs of circuitry 914 are the core clock signals, PH2 and PH1.

The PA output, essentially the PH2 signal as output from delay 907B, produces the feedback signal CLKINN for clock generation circuitry 900 through AND gates 910A and 911 and delay 912. The feedback signal is the CLKIN signal produced by clock generation circuitry 900. When the PLL is in lock, the high going edges of the CLK signal and the CLKINN signal will be coincident. Upon chip power-up, the control voltage VCNTRL causes the VCO frequency to increase until the frequency of occurrence of the positive edges of the two inputs CLK and CLKINN to frequency/phase detector 902 are equal. The closed loop adjustment of the VCO frequency continues until the phase-error between the occurrence of the positive edges of CLK and CLKINN is at a minimum. The PLL is then in lock.

The AND gate 910A acts to either "swallow" the feedback signal or allow it to pass through depending on its input from OR gate 909A. During 2X mode, AND gate 910A (and AND gate 910B) masks every other clock signal. Therefore, the feedback signal being input into AND gate 911 is one-half the frequency of the feedback signal, i.e. one-half the frequency of the PH2 core clock signal during 2X mode. Inverter 913 is the other input to AND gate 911 and allows the feedback signal to pass through AND gate 911 when the PH1 signal, which is from the PB output of divide-by-two 906 buffered by delay 907D, is low. This ensures proper timing between the core clock signals and the bus clock signals.

The output of AND gate 911 is the CLKIN signal. In 1X mode, since the feedback signal is allowed to pass through AND gate 910A, the CLKIN signal is the same frequency as the PH2 core clock signal (and the PUPH2 clock signal). In 2X mode, since every other pulse of the feedback signal is masked, the CLKIN signal is one-half the frequency of the PH2 core clock signal. This is also the same relationship between the CLKOUT signal and the PH1 core clock signal (and PUPH1 clock signal), as output by AND gate 910B.

The CLKIN signal, i.e. the feedback signal, is delayed by delay 912 and fed back through the PLL by input buffer 901 B. In 2X mode, since the feedback frequency is one-half the input CLK signal, charge pump 903 and loop filter 904 produce more voltage to compensate for the large difference between the frequencies of the CLK and CLKIN signals. The large control voltage produced causes VCO 905 to generate a higher frequency. A higher frequency from 905 produces the PH1 and PH2 core clock signals and the PUPH1 and PUPH2 clock signals that are higher in frequency. In this manner, the core clock signals of PH1 and PH2 and the PUPH1 and PUPH2 clock signals are generated by the present invention at twice (2X) the frequency of the CLK signal.

The operation of AND gate 910A is controlled by the output of OR gate 909A. Similarly, the operation of AND gate 910B is controlled by the output of OR gate 909B. When the outputs of OR gates 909A and 909B are low, then the outputs of AND gates 910A and 910B are low, thereby masking the clock signals received on their other inputs. When the outputs of OR gates 909A and 909B are high, then the other inputs of AND gates 910A and 910B are allowed to pass freely (with the exception of a small gate delay), such that the clock signals are not masked.

The outputs of OR gates 909A and 909B are controlled by each of their two inputs. One of the inputs to OR gates 909A and 909B are the Q outputs of D flip-flops 908A and 908B respectively. Furthermore, both OR gates 909A and 909B receive the MODE signal which sets the phase locked loop of clock generation circuitry 900 in its mode. In other words, the MODE signal permits the PLL to operate in 1X mode or another mode which produces core clock signals which have a frequency that is a multiple of the bus clock signals (i.e., 2X, 3X, 4X, etc.). In the currently preferred embodiment, the MODE signal selects either the 1X mode or the 2X mode. In the currently preferred embodiment, when the MODE signal is high (i.e., a logical 1), clock generation circuitry 900 is placed into 1X mode, and when the MODE signal is low (i.e., a logical 0), clock generation circuitry 900 is placed into 2X mode.

When clock generation circuitry 900 is in 1X mode, the output of OR gate 909A is always a logical 1. A logical 1 output from OR gate 909A causes the feedback signal to be passed through AND gate 910A without being masked. Moreover, the PB signal is passed through AND gate 910B as the CLKOUTA signal (and eventually the CLKOUT signal through AND gate 941). In this situation, the CLKOUT and CLKINN signals are the same frequency as the PH1 and PH2 core clock signals (and the PUPH1 and PUPH2 clock signals). Thus, the bus (FIG. 1) operates at the same frequency as the core of the processor (FIG. 2).

When clock generation circuitry 900 is switched into 2X mode, the output of OR gates 909A and 909B is determined by the output of D flip-flops 908A and 908B respectively. When the output of D flip-flop 908A is a logical 1, a logical 1 appears at AND gate 910A and allows the feedback signal to pass. When the output of D flip-flop 908A is a logical 0, a logical 0 appears at AND gate 910A, and AND gate 910A masks the feedback signal, thereby preventing it from passing through the gate. Similarly, when the output of D flip-flop 908B is a logical 1, a logical 1 appears at AND gate 910B and allows the output of the CLKOUTA signal, and when the output of D flip-flop 908B is a logical 0, a logical 0 appears at AND gate 910B, and AND gate 910B masks the CLKOUTA signal, thereby preventing it from passing through.

D flip-flops 908A and 908B are added as a second divide-by-two master/slave flip-flop. D flip-flops 908A and 908B are added off phase so that it is not in the critical path. The output of delay 907B clocks both D flip-flops 908A and 908B. However, the output of delay 907B clocks D flip-flops 908A and 908B on alternating clock pulses by having the clock input to D flip-flop 908A inverted upon receipt. Therefore, every other clock pulse of the output of delay 907B produces a logical 1 (or 0) output from D flip-flop 908A, while on the other clock pulses the output of delay 907B produces a logical 1 (or 0) output from D flip-flop 908B. Note that D flip-flops 908A and 908B produce alternating 1 and 0 outputs by being coupled with a feedback loop through inverter 915. When the D input of D flip-flop 908A is a 1 and D flip-flop 908A receives a low clock pulse (i.e., no clock signal) from delay 907B, its Q output is a 1. This Q output is then input into the D input of D flip-flop 908B, such that upon the next clock pulse, its Q output will be a 1. The Q output of 1 from D flip-flop 908B is inverted by inverter 915 and input to the D input of D flip-flop 908A, such that when the next clock pulse occurs, D flip-flop 908A will output a 0. The Q output of 0 is then feed into D flip-flop 908B. This feedback cycling is continuous.

Therefore, when clock generation circuitry 900 is in 2X mode, every other clock pulse of the output of delay 907B produces a logical 1 output from OR gate 909A, preventing AND gate 910A from allowing the feedback signal to pass through AND gate 910A. Furthermore, in this situation, AND gate 910B prevents the PB signal from passing through it as the CLKOUTA signal every other clock pulse such that the CLKOUT signal goes low. Therefore, both the CLKOUT and CLKIN signals are at half the frequency of the PH1 and PH2 core clock signals because half of the signal pulses are masked. However, even though they are half the frequency, the timing of the signals is exactly the same because the rising and falling edges of the bus clock signals, CLKIN and CLKOUT, are aligned with rising and falling edges of the core clock signals, PH2 and PH1, respectively (and the PUPH2 and PUPH1 clock signals respectively). Thus, in the currently preferred embodiment, the core of the processor (FIG. 2) is allowed to operate at twice the speed of the bus without changing the timing and without additional interface circuitry.

FIG. 10 illustrates timing signals associated with the operation of the clock generation circuitry 900. The use of the divide-by-two master/slave flip-flop (D flip-flops 908A and 908B) and the two AND gates (910A and 910B) provides the pulse-swallower functionality utilized by the present invention to generate the 2X core clock signals. The divide-by-two master/slave flip-flop generates the inhibit signals INH1 and INH2 that act as pulse swallowers for every other CLKOUTA (and, thus, the CLKOUT signal) and CLKIN. In the currently preferred embodiment, this causes the VCO frequency VCOOUT to be 4X that of the input clock frequency (i.e., EFI). Note that in FIG. 10, the CLKOUT and CLKIN signals are quarter duty cycle and have a correct timing relationship with the core clock signals.

Note that the clock signals which are output from delays 907A and 907C are not output directly to the core of the processor. The clock signals are input into control circuitry 930. In the present invention, control circuitry 930 is responsible for powering up and down the processor upon the appropriate internal or external request. In other words, control circuitry 930 is capable of placing the processor in and out of a reduced power consumption state. In the present invention, control circuitry 930 powers down the processor by disabling the PH1 and PH2 core clock signals, thereby preventing the clocking of the core of the processor. Upon receiving the appropriate power up request once in the power down mode, control circuitry 930 powers up the processor. In the currently preferred embodiment, control circuitry 930 powers up the processor by enabling the PH1 and PH2 core clock signals to the core. The powering up and down capability of control circuitry 930 includes the ability to power up the processor to compensate for actions taken by the computer system when the processor is in the power down mode (i.e., the reduced power consumption state). Once the processor performs the necessary actions in response to the actions of the remainder of the computer system, control circuitry 930 returns the processor to the reduced power consumption state.

In the currently preferred embodiment, the PH1 and PH2 core clock signals are disabled in response to either the SRLPD signal or the UNDC signal being asserted. The SRLPD signal is asserted when the processor receives a request to stop operation and power down (i.e., enter a reduced power consumption state). The UNDC signal is asserted when the processor is in the idle state (i.e., the state of no activity), such that the processor can be powered down. For more information on the use of the UNDC signal and its generation, see concurrently filed co-pending application Ser. No. 08/036,627, entitled "Method and Apparatus for Powering Down a Processor When Idle," assigned to the assignee of the present invention. In the currently preferred embodiment, both the SRLPD and UNDC signals are active high. In the currently preferred embodiment, the EADSN signal enables the clock signals while in the power down mode, such that the processor is powered up and capable of performing its requisite functions and operations when the EADSN signal is asserted. In the currently preferred embodiment, the EADSN signal is active low. For more information on the use of the EASDN signal and its generation, see concurrently filed co-pending application Ser. No. 08/036,470, entitled "Method and Apparatus for Invalidating a Cache While in a Low Power State," assigned to the assignee of the present invention.

Assuming the EADSN signal is high (i.e., not asserted), if either the SRLPD signal or the UNDC signal is asserted, then the output of OR gate 931 is high, thereby causing the output of AND gate 932 to be high. When the output of AND gate 932 is high, the EPH2 output of control circuitry 930 is always high. Also if either the SRLPD signal or the UNDC signal is asserted, then the output of inverter 934 is low. The output of inverter 934 being low results in the output of OR gate 936 to be low, thereby causing the output of AND gate to be low. Therefore, in the currently preferred embodiment, when either the SRLPD signal or the UNDC signal are asserted, such that the processor is in the power down mode, the EPH2 and EPH1 inputs to PH1/PH2 circuitry 914 are always high and low respectively, such that the PH2 core clock signal is always high and the PH1 core clock signal is always low. Note also that when the output of OR gate 936 is low, AND gate disables the CLKOUT signal, such that when the CLKOUT signal does not clock the output buffers of the processors when in the power down mode. Note also that even when in the power down mode, the PUCOUT signal is still output from clock generator 900, such that the Hold Acknowledgment signal can be output when the processor is in the powerdown mode.

Assuming that either the SRLPD signal or the UNDC signal is asserted and the processor is in the power down mode, if the EADSN signal is asserted, then the output of AND gate 932 is low, thereby causing OR gate 933 to act like a pass gate for the clock signal from delay 907A. In this manner, the EPH2 output from control circuitry 930 is the clock signal from delay 907A. Similarly, if the EADSN signal is asserted, then the output of inverter 935 is high, thereby causing OR gate 936 to output a high. The high output of OR gate 936 causes AND gate 937 to output the state of the clock signal received on its other input from delay 907C. The output of AND gate 937 is then input as the EPH1 input into PH1/PH2 circuitry 914.

Note that if either the SRLPD signal or the UNDC signals is asserted, the PLL of the present invention continues to run and remains in lock during the power down mode. In this manner, the PLL of the present invention is able to power up quickly since the PLL is already in lock.

PH1/PH2 circuitry 914 is the driver of the PH1 and PH2 core clock signals. The PH1 and PH2 core clock signals are driven in response to the EPH1 and EPH2 input clock signals respectively. The operation of PH1/PH2 circuitry 914 is well-known in the art. Note that in the power down state, the PH1 and PH2 core signals are placed in predetermined states, as discussed above.

PH1/PH2 circuitry 924 is the driver of the PUPH1 and PUPH2 clock signals. The PUPH1 and PUPH2 clock signals are driven directly from the outputs of delays 907C and 907A respectively. In the currently preferred embodiment, these signals are not powered down when the processor receives a stop request or an idle indication. Thus, the PUPH1 and PUPH2 clock signals are not placed in predetermined states when the processor is placed in the reduced power consumption state. The PUPH1 and PUPH2 clock signals clock the operation of the power down control logic of the present invention, such that the microprocessor is responsive to stop clock events when in the reduced power consumption state. Also the PUPH1 and PUPH2 clock signals are used to clock the synchronizers for the inputs during the power down mode. Note that although PH1/PH2 circuitry 924 and PH1/PH2 circuitry 914 have the same circuit structure, in the currently preferred embodiment, PH1/PH2 circuitry 924 is a smaller driver.

Clock generation circuitry 900 also includes EFI stop detect logic 931. EFI stop detect logic 931 detects the stoppage of the external clock signal (i.e., EFI) and disables VCO 905 and divide-by-two 906 once the external clock has been stopped using the STDBY signal.

Power Down Modes of the Present Invention

In the currently preferred embodiment, the processor of the present invention includes two separate power down states: stop request power down mode and standby mode. The stop request power down mode corresponds to the mode in which the PH1 and PH2 core clocks are disabled (i.e., frozen), while the PLL of the present invention continuously runs and the CLKIN and CLKIN bus clock signals are running. In the standby mode, the sequential logic of the processor is in a fully powered down state. That is, the PLL, including the core clock signals and bus clock signals, are not running. In the currently preferred embodiment, the processor is fully powered down by removing the external clock input to the processor (i.e., the EFI).

The present invention enters the stop request power down mode from the normal execution state by asserting either the SRLPD signal or the UNDC signal. The SRLPD signal is asserted in response to the execution of a power down instruction (e.g., a HALT instruction) or the occurrence of a stop clock interrupt. In the currently preferred embodiment, the stop clock interrupt is asserted in response to the assertion of a STPREQ# pin on the processor. In the currently preferred embodiment, the STPREQ# signal is active low. Once in the stop request mode, the PLL remains running, as do the CLKIN and CLKOUT signals, while the PH1 and PH2 core phases are frozen.

In the currently preferred embodiment, once in the stop request mode, the processor may transition to one of two power down states. The processor may transition back to the fully powered normal execution state or the processor may transition to the standby mode. In the currently preferred embodiment, the stop request power down mode returns to the normal execution state on the rising edge of the STPREQ# signal or the assertion of a reset (RESET) signal. The RESET signal utilized by the processor in the present invention operates in a manner well-known in the art. In the present invention, edge detection logic in the stop request latch de-asserts the SRLPD signal. In the currently preferred embodiment, the processor enters the standby mode upon the stopping of the external clock signal (i.e., the EFI). In the standby mode, the PLL and all phases generated by the clock generation circuitry of the processor are frozen.

In the present invention, the processor exits the standby mode upon starting the EFI. In the currently preferred embodiment, when the processor exits the standby mode, the processor enters the stop request power down mode. In the currently preferred embodiment, the processor re-synchronizes the PLL and enters the stop request power down mode after approximately 1 msec. As stated above, the processor then returns to the normal execution state upon the assertion of a RESET signal or upon the rising edge of the STPREQ# signal.

The Stop Request Power Down Mode

Once the processor enters the stop request power down mode, the clock generation circuitry of the present invention freezes the PH1 and PH2 core clocks, while having the PLL run continuously and provide the CLKIN and CLKOUT signals. In the present invention, the PH1 and PH2 core clocks are frozen using the SRLPD signal. As stated above, in the currently preferred embodiment, when the SRLPD signal is asserted, the output of OR gate 931 is high. Assuming that the EADSN signal is high (i.e., not asserted), then this causes the output of AND gate 932 to be high. When the output of AND gate 932 is high, the EPH2 signal output from control logic 930 is high, resulting in the PH2 core clock signal being high. Similarly when the SRLPD signal is asserted, assuming the EADSN signal is high, both inverters 934 and 935 produce logical 0 outputs, causing OR gate 936 to output a logical 0 to AND gate 937. The logical 0 input to AND gate 937 results in control circuitry 930 always outputting the EPH1 signal being low, such that the PH1 core clock signal from driver circuitry 914 is always low. Thus, when the SRLPD signal is asserted (assuming the EADSN signal is high), the PH2 core clock signal is brought to a high state and the PH1 core clock signal is brought to a low state. By having each of the PH1 and PH2 core clock signals in predefined states, the portions of the processor receiving those signals are not clocked.

When the SRLPD signal is de-asserted (and assuming the UNDC signal and EADSN signal are de-asserted), the output of OR gate 931 goes low, such that the outputs of AND gate 932 and OR gate 936 are low and high respectively. In this manner, the clock signals from delays 907A and 907B are allowed to pass through control circuitry 930 uninhibited (with the exception of a minor gate delay). Hence, in the present invention, the SRLPD signal is used to place the clock generation circuitry of the present invention in and out of the stop request power mode.

The currently preferred embodiment of the circuitry in the processor to generate the freeze signal (i.e., the SRLPD signal) used to freeze the PH1 and PH2 core clocks in the present invention is shown in FIG. 11. Referring to FIG. 11, the clock generation circuitry of the present invention is shown as PLL 1101. PLL 1101 is coupled to receive the Q output from stop clock (STPCLK) logic 1102. The Q output is received on the freeze FRZ) input of PLL 1101. PLL 1101 is also coupled to receive the EFI clock input. In response to these inputs, PLL 1101 outputs the freeze-able core clocks PH1 and PH2 and the bus clock signals CLKIN and CLKOUT.

STPCLK logic 1102 produces its Q output in response to signals on its set (S) and reset (R) inputs. In the currently preferred embodiment, STPCLK logic 1102 includes a master/slave S/R flip-flop which acts as a stop request latch. In the present invention, the S input of STPCLK logic 1102 is coupled to an output from decoder 1103. Decoder 1103 produces the output in response to a microcode control field received on one of its inputs. One reset (R) input of STPCLK logic 1102 is coupled to the STPREQ# signal. Another reset (R) input of STPCLK logic 1102 is coupled to the output of AND gate 1104. One input of AND gate 1104 is coupled to the output of OR gate 1105. The inputs of OR gate 1105 are coupled to system interrupts including the STPREQ# signal. Another input of AND gate 1104 is coupled to a halt cycle indication (HALT).

The generation of the FRZ input (i.e., the SRLPD signal) in FIG. 11 occurs when the stop request latch of STPCLK logic 1102 is set. In the present invention, the stop request latch is set by the signal from decoder 1103. In the currently preferred embodiment, decoder 1103 sets STPCLK logic 1102 in response to a stop clock interrupt (from the STPREQ# pin) or in response to the execution of a HALT instruction.

Figure 12:
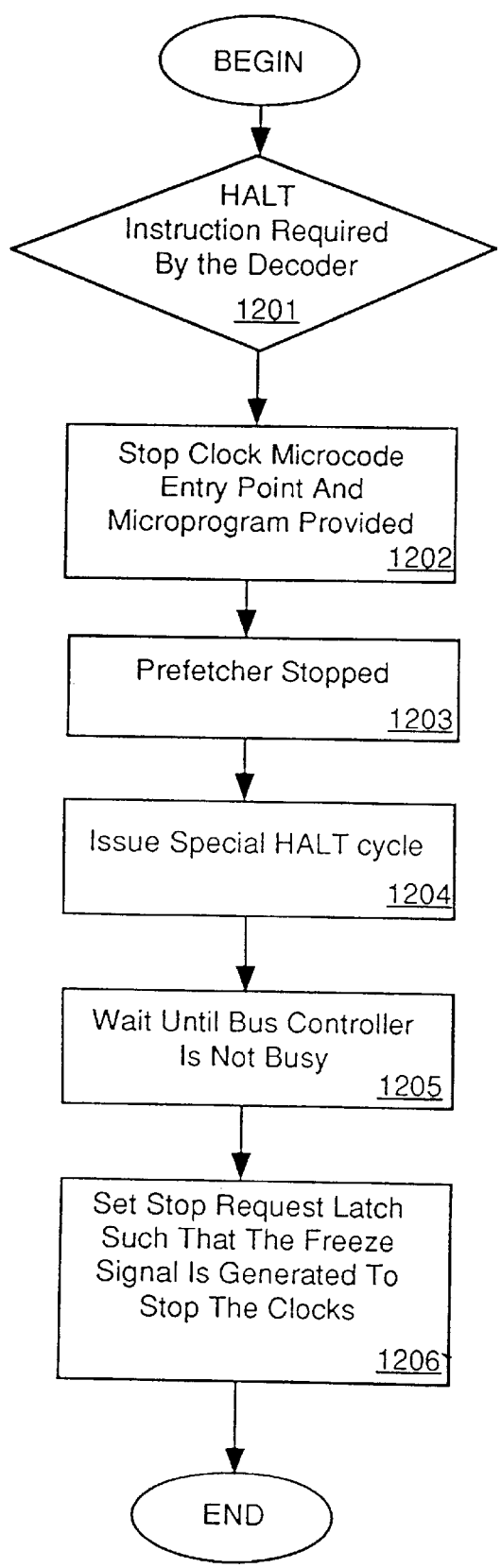
FIG. 12 is a flow chart of the execution of a HALT instruction according to the present invention.

When the HALT instruction is received, the instruction decoder 1103 decodes the HALT instruction, thereby causing the HALT macroinstruction to be translated into microinstructions through the use of the microcode unit. The execution of the HALT instruction is depicted in FIG. 12. Referring to FIG. 12, the HALT instruction is decoded (processing block 1201). The microcode unit includes a stop clock microcode entry point and microcode program (processing block 1202) designed to implement a number of specialized tasks associated with stopping the internal clocks, such that the processor can be placed in the stop request power down mode. The stop clock microcode then waits until the prefetcher is idle and then stops the prefetcher, such that the pipeline is placed in a freeze condition (i.e., a frozen state) (processing block 1203). The microcode then issues a special halt cycle on the bus (processing block 1204) which causes the HALT input into AND gate 1104 to be set. Next, the microcode waits until the bus controller is not busy (processing block 1205). The microcode engine then initiates execution of a microcode loop which examines the STPCLK micro-flag (i.e., driven by the STPREQ# pin) and the interrupt inputs (i.e., stop break events). When the STPREQ# signal becomes de-asserted or an interrupt occurs, control then falls out of the microcode loop and the processor begins executing the next instruction or begins handling the received interrupt. However, until the STPREQ# signal is de-asserted or an interrupt occurs, the microcode causes the assertion of a signal that sets the stop request latch of logic 1102 (processing block 1206). In the currently preferred embodiment, this signal is derived from the decoding of a microinstruction.

When a stop clock interrupt occurs, the interrupt is latched into an interrupt prioritizer. The STPCLK interrupt microcode is then executed on the next instruction boundary.

The setting of the stop request latch of logic 1102 causes the FRZ signal (the stop request power down signal SRLPD) to be asserted, such that control logic 930 (FIGS. 9A and 9B) freezes the global core clock phases with PH2 high and PH1 low. The CLKIN and CLKOUT bus clock phases, as well as the PUPH1 and PUPH2 clock phases continue to run. The CLKIN bus clock signal allows the clock control logic to monitor the inputs for bus holds and for stop break events which bring the processor out of the stop request mode or placing the processor in standby mode. During the stop request power down mode, the PUPH1 and PUPH2 clocks will clock the synchronizers and the STPCLK logic 1102. In this mode, the currently preferred embodiment of the present invention consumes only approximately five percent of its normal power during execution. Note that after entering the stop request power down mode, the external clock input (EFI) may be stopped to place the processor in the standby mode.

The present invention includes circuitry to determine when the processor should return to full operational mode. In the currently preferred embodiment, this circuitry returns to full operational mode in response to one of a predetermined number of stop break events. In the currently preferred embodiment, only one stop break event can restart the clocks while in the stop request power down mode due to a stop clock interrupt being asserted. In the currently preferred embodiment, the rising edge of the STPREQ# input pin causes the exiting of the stop request power down mode. In the present invention, edge detection logic in STPCLK logic 1102 de-asserts the SRLPD signal, thereby causing the PH1 and PH2 signals to be enabled from the clock generation circuitry (i.e., PLL 1101).

In the currently preferred embodiment, if the stop request power down mode was entered in response to the execution of a HALT instruction, the SRLPD signal (i.e., the freeze input) is only de-asserted when an interrupt occurs or the rising edge of the STPREQ# input pin occurs, and the HALT instruction has finished execution. The present invention knows when the HALT instruction has been executed by detecting that a HALT cycle has been driven onto the bus. In other words, a HALT signature exists on the pins. The present invention uses control logic to determine when the HALT cycle has been driven on the bus. All of the interrupts are ORed together by OR gate 1105 into one stop break event. When both of these conditions are met, the output of OR gate 1105 is high, causing both inputs to AND gate 1104 to be high. When both inputs of AND gate 1104 are high, the output of AND gate 1104 resets the stop request latch in STPCLK logic 1102. The FRZ signal is then de-asserted causing the processor to exit the stop request power down mode.

Upon exiting the stop request power down mode after a HALT instruction, the processor is going to be waiting at the end of the HALT instruction for an interrupt to the next portion of user code. By using the HALT instruction to enter the stop request power down mode, the present invention is able to enter and exit the lower power state without any difference in latency (i.e., a zero latency difference). In other words, the present invention enters and exits the stop request power down mode transparent to the remainder of the computer system.

The present invention enters and exits the stop request power down mode without any difference in latency. In the current preferred embodiment, this is due to two features. First, the logic used to freeze the core clock signals allows a decision to be made as to whether to freeze the core clock signals or not to freeze in the middle of the PH2 clock. In other words, the signals used to freeze the clocks may be triggered in the middle of the PH2 clock Second, all of the stop break events have synchronizers with four phases of delay, wherein the stop break events are clocked in by a CLKIN, PUPH1, PUPH2, PUPH1 and PUPH2 clock phases in succession. However, the stop break event signal is taken after the third phase of delay (i.e., at the PUPH1 clock phase) and routed to unfreeze the core clock signals. Therefore, by the time the stop break event is fully received through four phases of delay, the core clock phases are unfrozen, such that the core may begin execution as soon as the stop break event is received. Thus, the effect of the one phase delay produced by deciding whether to assert or deassert the SRLPD signal is canceled by using the signal one phase earlier. That is, when the processor is powered back up again, the data in the latches is read into the PH1 logic, such that the processor continues as if it were never powered down, such that there is a zero latency difference.

By using the HALT instruction, the processor of the present invention is able to save power, which is particularly important in today's laptop and notebook computer markets. Furthermore, using the HALT instruction of the present invention, the processor is able to automatically and transparently reduce power to the internal core. The processor can transition in and out of a reduced power consumption state transparently to the rest of the computer system. In other words, the processor of the present invention may be inserted into the computer system and provide the computer system with the added ability to reduce power consumption (by reducing the power consumption of the processor) without having to change the circuit board of the computer system in any way. In this manner, one can upgrade the computer system to obtain higher performance solely by changing the processor of the system.

Note that in the currently preferred embodiment of the present invention, if after entering the stop request mode due to the execution of a HALT instruction, a stop clock interrupt is asserted, the processor will power up into the normal execution state, take the stop clock interrupt and then power back down again. When the rising edge of the STPREQ# pin occurs, the original HALT will be re-executed and the processor returns to the power down mode of the HALT instruction.

It should be noted that the currently preferred embodiment, the integrated circuit being powered down is a static part, such that the stoppage of the clock does not result in a loss of state. However, if the integrated circuit is a dynamic part which cannot have the clocks stopped without losing state, then in response to the execution of a HALT instruction a divide by X circuit (where X can by any arbitrary number such as 32) may be employed to reduce the clock speed of the output of the PLL.

The Standby Mode

Once the processor of the present invention is in the stop request power down mode, it may transition to the standby mode. In the standby mode, the sequential circuitry of the processor is completely powered down. The sequential circuitry is completely powered by the removal, or stoppage, of the external clock input (EFI). The EFI may be stopped in various manners well-known in the art.

When the processor is in the standby mode, the present invention turns off the clock generation circuitry, particularly the PLL. In the present invention, the PLL is turned off once the EFI input is stopped in order to prevent the PLL from attempting to lock onto the new clock input. That is, once the input frequency is stopped, VCO 905 will lower its output frequency in an attempt to lock onto the new clock input. Since VCO 905 will never be able to attain lock (because there is no clock signal), it must be turned off to avoid consuming power. The present invention provides circuitry for detecting when the EFI clock has been removed. The present invention also includes circuitry which turns off VCO 905 upon no longer detecting an EFI clock signal. In the currently preferred embodiment, this circuitry also turns off divide-by-two 906.

Figure 13:
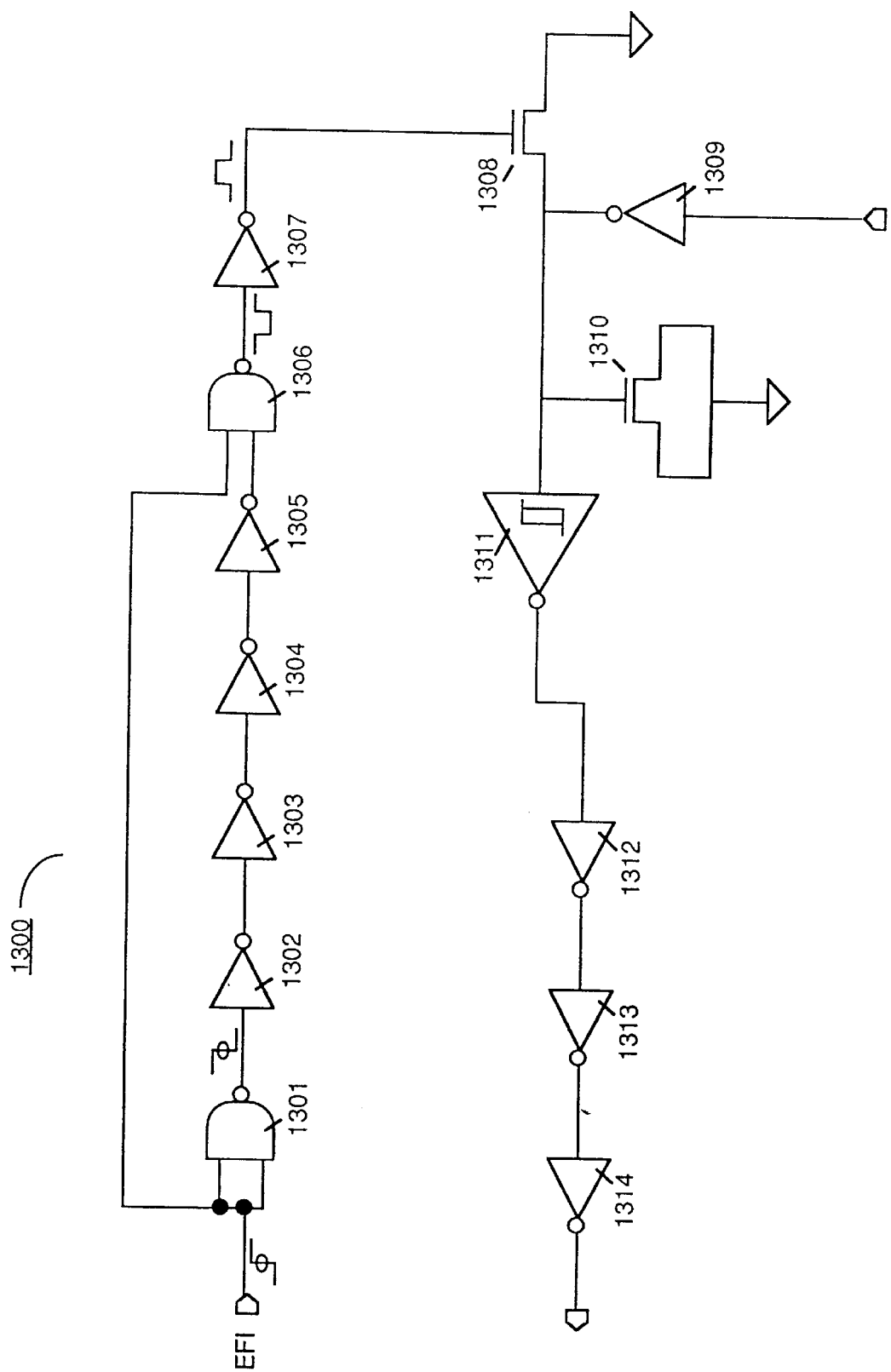
FIG. 13 is a schematic of the EFI stop detection circuitry of the present invention.

FIG. 13 is a schematic of the currently preferred embodiment of the EFI stop clock detection logic 1300 of the present invention. The EFI stop clock detection logic of the present invention determines when the external clock input has stopped providing clock signals to the processor of the present invention. The determination of whether the external clock input has been stopped is important in that without the detection logic of the present invention, the removal of the clock signal would cause the VCO of the PLL to attempt to lock onto a non-existent clock signals.

Referring to FIG. 13, detection logic 1300 comprises inverters 1302–1305, 1307, 1309, 1312, 1313 and 1314, NAND gates 1301 and 1306, n-channel transistor devices 1308 and 1310, and hysteresis device 1311. The EFI input is coupled to both inputs of NAND gate 1301 and one input of NAND gate 1306. The output of NAND gate 1301 is coupled to the input of inverter 1302. The output of inverter 1302 is coupled to the input of inverter 1303. The output of inverter 1303 is coupled to the input of inverter 1304. The output of inverter 1304 is coupled to the input of inverter 1305. The output of inverter 1305 is coupled to the other input of NAND gate 1306. The output of NAND gate 1306 is coupled to the input of inverter 1307. The output of inverter 1307 is coupled to the gate of n-channel transistor device 1308. The source of n-channel transistor device 1308 is coupled to ground and the drain is coupled to the input of hysteresis device 1311. In the currently preferred embodiment, hysteresis device 1311 is a Schmitt trigger. The input of hysteresis device 1311 is also coupled to the output of inverter 1309. The input of inverter 1309 is coupled to ground. The input of hysteresis device 1311 is also coupled to the gate of n-channel device 1310. The source and drain of n-channel device 1310 are coupled to ground. Device 1310 acts as a thin oxide capacitor. The output of hysteresis device 1311 is coupled to the input of inverter 1312. The output of inverter 1312 is coupled to the input of inverter 1313. The output of inverter 1313 is coupled to the input of inverter 1314. The output of inverter 1314 is the output of detection logic 1300.

Gates 1301–1305 are coupled serially to delay the clock signal. When the EFI clock input supplies clock signals to the input of detection logic 1300, the delay provided by gates 1301–1305 causes the output of NAND gate 1306 to be a logical 0 for every clock pulse received as an input. The output of NAND gate 1306 is inverted by inverter 1307, thereby causing transistor device 1308 to turn on. When transistor device 1308 is on, the input to hysteresis device 1311 is grounded. The grounding of the input of hysteresis device 1311 nullifies any effects produced by transistor 1310 and inverter 1309. The grounded input of hysteresis device 1311 produces an output of 1 to inverter 1312. Inverters 1312 and 1313 are coupled serially to provide a delay, such that a 1 input to inverter 1312 is output from detection logic 1300 after three inverter gate delays. Thus, as long as detection logic 1300 receives clock signals, the output of detection logic 1300 is 0. The 0 output of detection logic 1300 allows VCO 905 and divide-by-two 906 to function as described above in conjunction with FIGS. 9A and 9B.

When the clock input to the processor is stopped, the output of NAND gate 1306 will be a logical one, thereby causing inverter 1307 to output a logical 0. The logical 0 output from inverter 1307 turns off transistor device 1308, such that the input of hysteresis device 1311 is not grounded by transistor 1308. In this case, inverter 1309 provides a current to the input of hysteresis device 1311. In response to the current provided by inverter 1309, the input node to hysteresis device 1311 starts increasing in voltage. In the present invention, the size of inverter 1309 and 1310 are chosen in conjunction with hysteresis device 1311, such that the devices provide an appreciable delay before hysteresis device 1311 is triggered. The appreciable delay is necessary to ensure that false stop clock detections do not influence the PLL. In the currently preferred embodiment, after 1 microsecond, hysteresis device 1311 triggers, such that a logical 1 is output. This logical 1 is output from detection logic 1300 to VCO 905 and divide-by-two 906 (of FIGS. 9A and 9B). The logical 1 output of detection logic 1300 causes VCO 905 and divide-by-two 906 to be disabled. By disabling VCO 905, it will not attempt to lock onto the non-existent external clock input. The entire PLL circuitry will be placed in a non-power consuming mode.

Figure 14:
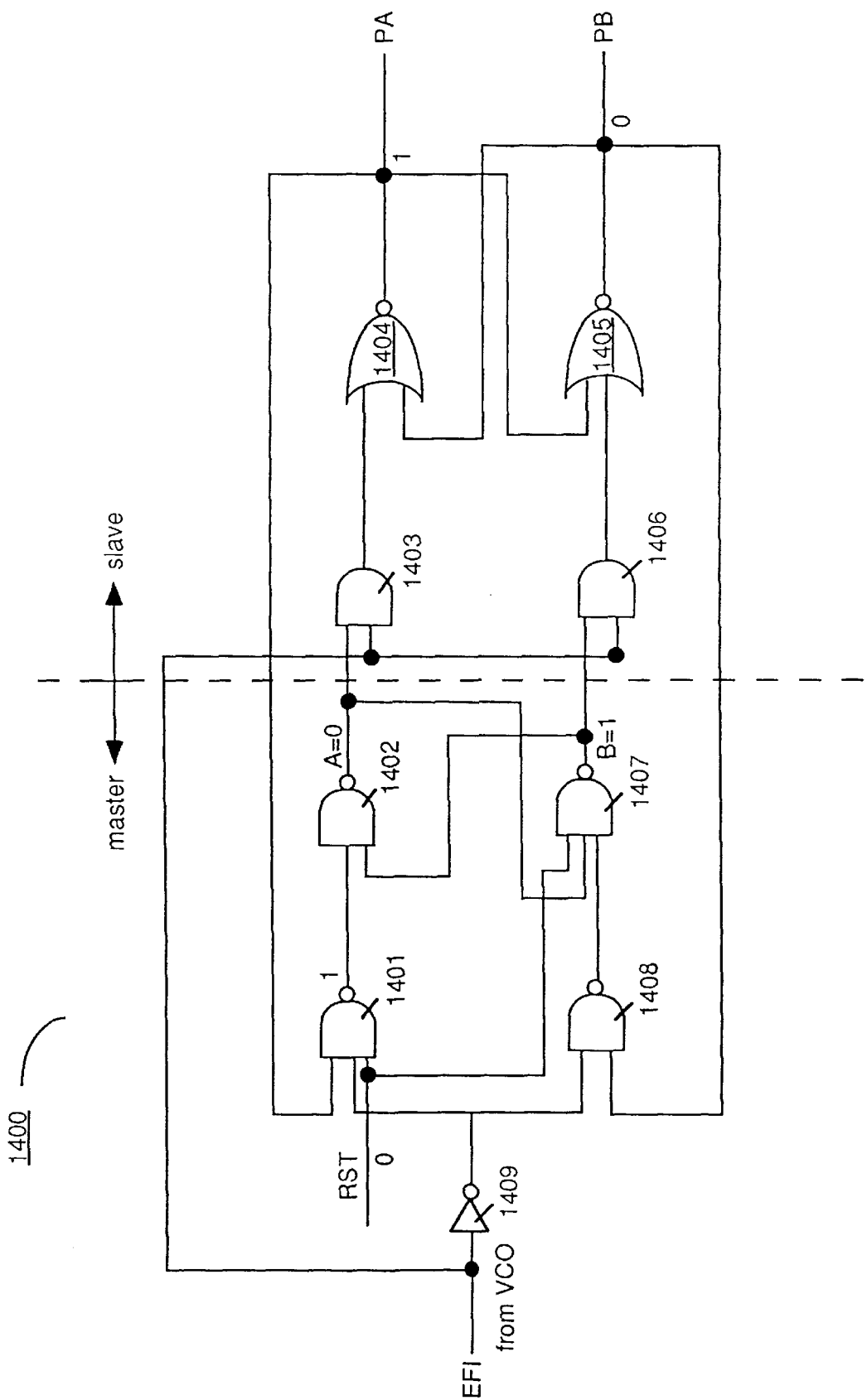
FIG. 14 is a schematic of the currently preferred embodiment of the divide-by-two of the present invention.

FIG. 14 is a schematic of the currently preferred embodiment of the divide-by-two 906 of the present invention. In the currently preferred embodiment, divide-by-two 1400 comprises NAND gates 1401, 1402, 1407 and 1408, AND gates 1403 and 1406, NOR gates 1404 and 1405, and inverter 1409. Gates 1401–1409 are coupled in a master/slave configuration. The input of inverter 1409 is coupled to the clock signal from the VCO. The output of inverter 1409 is coupled to one input of NAND gate 1401. The other inputs to NAND gate 1401 are coupled to the reset signal RST and the feedback output from NOR gate 1404. The output of NAND gate 1401 is coupled to the input of NAND gate 1402. The other input of NAND gate 1402 is coupled to the output of NAND gate 1407. The output of NAND gate 1402 is coupled to one input of AND gate 1403 and one input of NAND gate 1407. The other inputs of NAND gate 1407 are coupled to the RST signal and the output of NAND gate 1408. The inputs to NAND gate 1408 are coupled to the output of inverter 1409 and the output of NOR gate 1405. The output of NAND gate 1407 is also coupled to one input of AND gate 1406.

The input from the VCO is also coupled to the other inputs of AND gates 1403 and 1406. The output of AND gate 1403 is coupled to one input of NOR gate 1404. The other input of NOR gate 1404 is coupled to the PB output of NOR gate 1405. The output of NOR gate 1404 is the PA signal. The output of NOR gate 1404 is also coupled to one input of NOR gate 1405. The other input of NOR gate 1405 is coupled to the output of AND gate 1406. NOR gate 1405 produces the PB output of divide-by-two 1400.

As an example of the operation, as the EFI clock pulses are received, assume that the rising edge of EFI causes the PA output to transition low and PB to transition high. The subsequent falling edge of the EFI causes the output of NAND gate 1402 to transition low and the output of NAND gate 1407 to transition high, thereby forcing the PB to transition low and the PA output to transition high at the next EFI rising edge.

When the RST input goes low, NAND gate 1402 outputs a 0 and NAND gate 1407 outputs a 1. At the next clock, AND gates 1403 and 1406 output a 0 and 1 respectively. The 0 and 1 outputs are the inputs to NOR gates 1404 and 1405 and cause the PA and PB outputs to be 1 and 0 respectively. Note that a PA output of 1 results in the PH2 signal being high.

Therefore, when divide-by-two 906 is disabled, its outputs are placed in predetermined states which produce the outputs which are generated during the low power mode (i.e., the stop request mode). However, when the processor is in the standby mode, detection logic in the clock generation circuitry detects that the external clock input has stopped and turns off VCO 905 and causes the RST input of the divide-by-two 906 to go low.

Note that an EFI of any frequency may provide a clock signal to the PLL circuitry of the present invention. Because of this, the PLL of the present invention may enter the standby mode and, subsequently, change the external clock input (EFI) to one with a different frequency. In this manner, a clock input with a different frequency may be used with the processor.

Whereas many alterations and modifications of the present invention will no doubt become apparent to a person of ordinary skill in the art after having read the foregoing description, it is to be understood that the particular embodiment shown and described by way of illustration are in no way intended to be considered limiting. Therefore, reference to the details of the preferred embodiments are not intended to limit the scope of the claims which themselves recite only those features regarded as essential to the invention.

A method and apparatus for powering down a phase lock loop has been described.

We claim:

1. A computer system comprising:

bus means for communicating and transferring data and instructions in the computer system;

memory means coupled to said bus for storing information;

means for generating a first clock signal;

an integrated circuit comprising phase locked loop (PLL) circuit means coupled to said means for generating a first clock signal, wherein said phase locked loop generates at least one bus clock signal and at least one core clock signal in response to said first clock signal, processing means coupled to said bus means for processing data and executing the instructions synchronous to said at least one core clock signal, means coupled to said processing means and said PLL circuit means and internal to said integrated circuit for placing said processing means in a reduced power consumption state in response to the execution of a power down instruction by said processing means, such that said computer system reduces power consumption, and wherein the PLL continues to receive the first clock signal and remains running and in lock while in said reduced power consumption state, means coupled to said processing means and said PLL circuit means and internal to said integrated circuit for generating a first signal, said first signal operable to delay said processing means from transitioning from an address generation state to a data generation state, and means coupled to said processing means and said PLL circuit means and internal to said integrated circuit for generating a second signal, said second signal operable to mask data inputs to said processing means.

2. The computer system as defined in claim 1 wherein the power down instruction comprises a halt instruction that when executed by the processing means places the processing means in a HALT state as well as the reduced power consumption state.

3. The computer system defined in claim 2 wherein the processing means issues a halt cycle on the bus means in response to execution of the halt instruction.

4. The computer system as defined in claim 1 wherein the means for placing the processing means in a reduced power consumption state disables said at least one core clock signal from the processing means upon execution of the power down instruction, such that the processing means is not clocked.

5. The computer system as defined in claim 1 further comprising means for reenabling said at least one core clock signal to the processing means to remove the processing means from the reduced power consumption state.

6. The computer system as defined in claim 5 wherein the processing means exits the reduced power consumption state in response to the processing means being reset.

7. The computer system as defined in claim 5 wherein the processing means exits the reduced power consumption state in response to an external interrupt.

8. The computer system as defined in claim 1 wherein said means for placing said processing means in a reduced power consumption state includes circuitry for dividing the clock frequency of said at least one core clock signal using a divide by X, where X is an integer, such that the frequency of said at least one core clock signal is reduced upon execution of the power down instruction, and wherein said circuitry comprises:
input buffer means for receiving said bus clock signal;
phase detector means coupled to said input buffer means for producing a first timing adjustment signal and a second timing adjustment signal;
voltage controlled oscillator means coupled to said phase detector means for producing a frequency output, said frequency output operable to vary a frequency of said core clock signal dependent on said integer X.

9. The computer system as defined in claim 8 wherein said at least one core clock signal has a frequency which is a predetermined multiple of the frequency of said at least one bus clock signal.

10. The computer system as defined in claim 9 wherein said at least one core clock signal has pulses having a pulse width length equal to pulses of said at least one bus clock signal when said at least one core clock signal is at twice the frequency of said at least one bus clock signal.

11. The computer system defined in claim 1 wherein said at least one bus clock signal clocks inputs to the processing means while the processing means is in the reduced power consumption state, such that inputs are received.

12. The computer system defined in claim 1 wherein said at least one core clock signal comprises a first set of core clock signals and a second set of core clock signals, wherein the processing means is placed in the reduced power consumption state by preventing the processing means from being clocked by the first set of core clock signals while the second set of core clock signals clock operations of the means for placing the processing means in the reduced power consumption state.

13. The computer system defined in claim 12 wherein said at least one bus clock signal clocks inputs to the processing means while the processing means is in the reduced power consumption state, such that inputs are received.

14. The computer system defined in claim 13 wherein said second set of core clock signals clock inputs to the processing means in conjunction with said at least one bus clock signal while the processing means is in the reduced power consumption state.

15. A computer system comprising:
a bus that transfers data and instructions in the computer system;
a clock generator that generates a first clock signal;
an integrated circuit comprising:
a phase locked loop (PLL) circuit coupled to said clock generator, wherein said phase locked loop generates at least one bus clock signal and at least one core clock signal in response to said first clock signal;
a processing unit coupled to said bus to execute instructions synchronous to said at least one core clock signal, wherein the processing unit issues a halt cycle on the bus and enters a halt state in response to execution of a halt instruction;
a circuit logic coupled to said processing unit and said PLL circuit to place said processing unit in a HALT state and a reduced power consumption state in response to the execution of the halt instruction by the processing unit, wherein the circuit logic places the processing unit in a reduced power consumption state by disabling said at least one core clock signal upon execution of the power down instruction, such that the processing unit is not clocked, and wherein the PLL circuit continues to receive the first clock signal and remains running and in lock while in the reduced power consumption state, such that said computer system reduces power consumption;
a bus interface circuit coupled to said processing unit and said PLL circuit, said bus interface circuit operable to generate a first signal, said first signal operable to delay said processing unit from transitioning from an address generation state to a data generation state said bus interface circuit further operable to generate a second signal, said second signal operable to mask data inputs to said processing means.

16. The computer system as defined in claim 15 further comprising circuit logic that re-enables said at least one core clock signal to the processing unit to remove the processing unit from the reduced power consumption state.

17. The computer system as defined in claim 16 wherein the processing unit exits the reduced power consumption state in response to the processing unit being reset.

18. The computer system as defined in claim 16 wherein the processing unit exits the reduced power consumption state in response to an external interrupt.

19. The computer system defined in claim 15 wherein said at least one bus clock signal clocks inputs to the processing unit while the processing unit is in the reduced power consumption state, such that inputs are received; and wherein said circuit logic coupled to said processing unit further comprises:
an input buffer for receiving said at least one bus clock signal;
a phase detector coupled to said input buffer and operable to produce a first timing adjustment signal and a second timing adjustment signal; and
a voltage controlled oscillator coupled to said phase detector and operable to produce a frequency output said frequency output operable to vary a frequency of said core clock signal.

20. The computer system defined in claim 15 wherein said at least one core clock signal comprises a first set of core clock signals and a second set of core clock signals, wherein the processing unit is placed in the reduced power consumption state by preventing the processing unit from being clocked by the first set of core clock signals while the second set of core clock signals clock operations of the circuit logic during operation of the processing unit in the reduced power consumption state.

21. The computer system defined in claim 20 wherein said at least one bus clock signal clocks inputs to the processing unit while the processing unit is in the reduced power consumption state, such that inputs are received.

22. The computer system defined in claim 21 wherein said second set of core clock signals clock inputs to the processing unit in conjunction with said at least one bus clock signal while the processing unit is in the reduced power consumption state.

23. An integrated circuit for use in a computer system having a global clock signal and a bus comprising:

a phase locked loop (PLL) circuit generating at least one bus clock signal for clocking transfers with the bus and at least one core clock signal in response to the global clock signal;

a core executing a sequence of instructions synchronously with said at least one core clock signal, and further wherein one of said instructions comprises a halt instruction that causes the core to halt execution of the sequence of instructions upon execution;

a first logic circuit placing the core in a reduced power consumption state in response to the execution of the halt instruction, wherein said PLL continues to receive the global clock signal and remains continuously in lock when the core is in the reduced power consumption state; and a bus interface circuit coupled to said first logic circuit and said PLL circuit, said bus interface circuit operable to generate a first signal, said first signal operable to delay a processor within said core from transitioning from an address generation state to a data generation state, said bus interface circuit further operable to generate a second signal, said second signal operable to mask data inputs to said processor.

24. The integrated circuit as defined in claim 23 further comprising a second logic circuit to exit the core from the reduced power consumption state.

25. The integrated circuit as defined in claim 24 wherein the processor exits the reduced power consumption state in response to a reset signal.

26. The integrated circuit as defined in claim 24 wherein the processor exits the reduced power consumption state in response to an external interrupt.

27. The integrated circuit defined in claim 24 wherein said at least one bus clock signal clocks inputs to the core while the core is in the reduced power consumption state, such that inputs are received; and wherein said core further comprises:

an input buffer operable to receive said global clock signal;

a phase detector coupled to said input buffer and operable to produce a first timing adjustment signal and a second timing adjustment signal; and a voltage controlled oscillator coupled to said phase detector and operable to produce a frequency output, said frequency output operable to vary a frequency of said core clock signal.

28. The integrated circuit defined in claim 27 wherein said at least one core clock signal comprises a first set of core clock signals and a second set of core clock signals, wherein the core is placed in the reduced power consumption state by preventing the core from being clocked by the first set of core clock signals while the second set of core clock signals clock operations of the second circuit logic during operation of the core in the reduced power consumption state.

29. The integrated circuit defined in claim 28 wherein said second set of core clock signals clock inputs to the core in conjunction with said at least one bus clock signal while the core is in the reduced power consumption state.

30. The integrated circuit as defined in claim 23 wherein said first logic circuit places the processor in the reduced power consumption state by disabling said at least one core clock signal.

31. The integrated circuit as defined in claim 23 wherein the first logic circuit places the processor in the reduced power consumption state by freezing said at least one core clock signals in a high or low state.

32. The integrated circuit as defined in claim 23 wherein said integrated circuit further comprises a plurality of pins, and further wherein the core issues a halt signature on at least one of the plurality of pins in response to execution of the halt instruction.

33. The integrated circuit as defined in claim 23 wherein said PLL circuit clocks inputs with at least one bus clock signal when in the reduced power consumption state, such that processor continues receiving inputs while in the reduced power consumption state.

34. The computer system defined in claim 23 further comprising a bus controller, and wherein the core further comprises a prefetcher, wherein, as part of execution of the halt instruction, the core decodes the halt instruction, obtains a microcode entry point corresponding to the halt instruction, waits for the prefetcher to be idle, stops the prefetcher once idle, waits for the bus controller to be idle and then enters the halt state.

35. An integrated circuit for use in a computer system having a global clock signal and a bus comprising:

a phase locked loop (PLL) circuit that generates at least one bus clock signal for clocking transfers with the bus and first and second sets of core clock signals in response to the global clock signal;

a core to execute a sequence of instructions synchronously with said at least one core clock signal, and further wherein one of said instructions comprises a power down instruction that causes the core to halt execution of the sequence of instructions upon execution and enter into a Halt state in which a halt cycle is issued by the core on the bus;

a power management control logic to place the core in a reduced power consumption state in response to the execution of the power down instruction, wherein the power management control logic places the processor in the reduced power consumption state by freezing said first set of core clock signals in high and low states while said PLL continues to receive the global clock signal and remains continuously in lock and the second set of core clock signals clocks operations of the power management control logic; and a bus interface circuit coupled to said power management control logic, said bus interface circuit operable to generate a first signal, said first signal operable to delay said processor from transitioning from an address generation state to a data generation state, said bus interface circuit further operable to generate a second signal, said second signal operable to mask data inputs to said processor.

36. The integrated circuit as defined in claim 35 wherein the power management control logic causes the core to exit the reduced power consumption state.

37. The integrated circuit as defined in claim 36 wherein the processor exits the reduced power consumption state in response to a reset signal.

38. The integrated circuit as defined in claim 36 wherein the processor exits the reduced power consumption state in response to an external interrupt.

39. The integrated circuit defined in claim 35 further comprising a bus controller, and wherein the core further comprises a prefetcher, wherein, as part of execution of the halt instruction, the core decodes the halt instruction, obtains a microcode entry point corresponding to the halt instruction, waits for the prefetcher to be idle, stops the prefetcher once idle, waits for the bus controller to be idle and then enters the halt state.

40. The integrated circuit defined in claim 35 wherein said second set of core clock signals clock inputs to the core in conjunction with said at least one bus clock signal while the core is in the reduced power consumption state; and wherein said core further comprises:

an input buffer operable to receive said at least one bus clock signal;

a phase detector coupled to said input buffer and operable to produce a first timing adjustment signal and a second timing adjustment signal; and a voltage controlled oscillator coupled to said phase detector and operable to produce a frequency output said frequency output operable to vary a frequency of a core clock signal of said first set of core clock signals.

41. A processor for use in a computer system having a global clock signal and a bus comprising:

a clock generator coupled to receive the global clock signal, wherein said clock generator generates at least one bus clock signal for clocking transfers with the bus and at least one core clock signal in response to the global clock signal, wherein the clock generator comprises a phase locked loop that generates said at least one core clock signal;

a central processing unit (CPU) core to execute a sequence of instructions synchronously with said at least one core clock signal, wherein one of said instructions comprises a HALT instruction that causes the CPU core to halt execution of the sequence of instructions upon its execution and issue a halt cycle onto the bus;

a power management control logic that places the processor in a reduced power consumption state in response to the execution of the HALT instruction, wherein said power management control logic places the processor in the reduced power consumption state by disabling one of said at least one core clock signal while the PLL continues to receive the global clock signal and remains in lock during the reduced power consumption state and clocking operations of the power management control logic with another of said at least one core clock signal; and a bus interface circuit coupled to said power management control logic said bus interface circuit operable to generate a first signal, said first signal operable to delay said processor from transitioning from an address generation state to a data generation state, said bus interface circuit further operable to generate a second signal said second signal operable to mask data inputs to said processor.

42. The processor as defined in claim 41 wherein the power management control logic causes the CPU core to exit the reduced power consumption state.

43. The processor as defined in claim 42 wherein the processor exits the reduced power consumption state in response to the de-assertion of a stop clock pin.

44. The processor as defined in claim 41 wherein the power management control logic places the processor in the reduced power consumption state by freezing said at least one core clock signal in the high or low state.

45. The processor as defined in claim 41 wherein the processor exits the reduced power consumption state in response to a reset signal.

46. The processor as defined in claim 41 wherein the processor exits the reduced power consumption state in response to an external interrupt.

47. The integrated circuit defined in claim 41 further comprising a bus controller, and wherein the core further comprises a prefetcher, wherein, as part of execution of the halt instruction, the core decodes the halt instruction, obtains a microcode entry point corresponding to the halt instruction, waits for the prefetcher to be idle, stops the prefetcher once idle, waits for the bus controller to be idle and then enters the halt state.

48. The integrated circuit defined in claim 41 wherein said another of core clock signals clock inputs to the core in conjunction with said at least one bus clock signal while the core is in the reduced power consumption state; and wherein said power management logic further comprises:

an input buffer operable to receive said at least one bus clock signal;

a phase detector coupled to said input buffer and operable to produce a first timing adjustment signal and a second timing adjustment signal; and a voltage controlled oscillator coupled to said phase detector and operable to produce a frequency output said frequency output operable to vary a frequency of said at least one core clock signal.

49. A method of powering down an processor having a phase locked loop (PLL) that generates at least one core clock signal for clocking operations of a core of the processor, said method comprising the steps of:

decoding a halt instruction;

executing the halt instruction such that a signal is asserted to enter a power down state;

issuing a halt cycle on a computer system bus;

preventing said at least one core clock signal from clocking the core, such that the processor enters a reduced power consumption state, wherein the step of preventing includes maintaining the PLL in lock while the processor is in the reduced power consumption state and continues receiving a global clock signal;

generating a first signal, said first signal operable to delay said processor from transitioning from an address generation state to a data generation state; and generating a second signal said second signal operable to mask data inputs to said processor.

50. The method as defined in claim 49 further comprising the steps, occurring prior to the step of preventing said at least one core clock signal from clocking the core, of:

obtaining a microcode entry point corresponding to the halt instruction:

waiting for a prefetcher in the processor to be idle;

stopping the prefetcher once idle; and waiting for a bus controller in the processor to be idle.

51. The method as defined in claim 49 wherein the at least one core clock signal includes a first core clock signal and a second core clock signal, and wherein the step of preventing freezes the first core clock signal in a first logical state and freezes the second core clock signal in a second logical state different than the first logical state.

52. The method as defined in claim 49 further comprising the steps of:

generating an interrupt; and enabling said at least one core clock signal within the processor, such that the core exits the reduced power consumption state.

53. A method of a processor powering down a phase locked loop (PLL) that generates at least one core clock signal for clocking operations of a core of the processor, said method comprising the steps of:

decoding a HALT instruction;

obtaining a microcode entry point corresponding to the HALT instruction;

executing the HALT instruction causing assertion of a signal to enter the power down state;

issuing a halt cycle on a computer system bus and entering a Halt state; and preventing said at least one core clock signal from clocking the core, wherein the step of preventing includes the step of freezing said at least one core clock signal in a logic state and the step of continuously running the PLL in the reduced power consumption state, such that the PLL remains in lock while the processor continues to receive a global clock signal and enters a reduced power consumption state;

generating a first signal, said first signal operable to delay said processor from transitioning from an address generation state to a data generation state; and generating a second signal, said second signal operable to mask data inputs to said processor.

54. The method as defined in claim 53 wherein the at least one core clock signal includes a first core clock signal and a second core clock signal, and wherein the step of preventing freezes the first core clock signal in a first logical state and freezes the second core clock signal in a logical state opposite to that of the first logical state.

55. In a computer system that comprises a processor having a core executing a plurality of instructions that include a Halt instruction, wherein execution of the Halt instruction causes the core of the processor to stop executing user code and enter a wait state, an improvement comprising:

a power management mechanism internal to the processor to place the processor in a reduced power consumption state in response to execution of the Halt instruction; and a bus interface circuit coupled to said power management mechanism, said bus interface circuit operable to generate a first signal, said first signal operable to delay said processor from transitioning from an address generation state to a data generation state, said bus interface circuit further operable to generate a second signal, said second signal operable to mask data inputs to said processor.

56. The improvement of claim 55 wherein the power management mechanism maintains the processor in the reduced power consumption state while a phase locked loop, internal to the processor and providing clocking signals to the processor, remains in lock; said power management mechanism further comprising:

a phase detector coupled to said phase locked loop and operable to produce a first timing adjustment signal and a second timing adjustment signal;

a voltage controlled oscillator coupled to said phase detector and operable to produce a frequency output, said frequency output operable to vary a frequency of a clocking signal of said clocking signals.

* * * * *